United States Patent [19]
Chui

[11] Patent Number: 5,909,518
[45] Date of Patent: Jun. 1, 1999

[54] SYSTEM AND METHOD FOR PERFORMING WAVELET-LIKE AND INVERSE WAVELET-LIKE TRANSFORMATIONS OF DIGITAL DATA

[75] Inventor: Charles K. Chui, Palo Alto, Calif.

[73] Assignee: Teralogic, Inc., Mountain View, Calif.

[21] Appl. No.: 08/758,224

[22] Filed: Nov. 27, 1996

[51] Int. Cl.$^6$ .............................. G06K 9/36; H04N 7/12
[52] U.S. Cl. ..................... 382/277; 382/233; 382/244; 382/247; 382/248; 382/251; 382/279; 348/398
[58] Field of Search ...................... 382/277, 233, 382/244, 247, 248, 251, 279; 348/398

[56] References Cited

U.S. PATENT DOCUMENTS

| | | | |
|---|---|---|---|
| 4,599,567 | 7/1986 | Goupillaud et al. | 324/77 G |
| 4,974,187 | 11/1990 | Lawton | 364/728.01 |
| 5,014,134 | 5/1991 | Lawton et al. | 358/261.3 |
| 5,262,958 | 11/1993 | Chui et al. | 364/487 |
| 5,347,479 | 9/1994 | Miyazaki | 364/725 |
| 5,384,725 | 1/1995 | Coifman et al. | 364/807 |
| 5,388,182 | 2/1995 | Benedetto et al. | 395/2.14 |
| 5,392,255 | 2/1995 | LeBras et al. | 367/50 |
| 5,412,741 | 5/1995 | Shapiro | 382/232 |
| 5,414,780 | 5/1995 | Carnahan | 382/276 |
| 5,420,891 | 5/1995 | Akansu | 375/350 |
| 5,526,446 | 6/1996 | Adelson et al. | 382/275 |
| 5,546,477 | 8/1996 | Knowles et al. | 382/242 |

FOREIGN PATENT DOCUMENTS

| | | |
|---|---|---|
| 94300439 | 1/1994 | European Pat. Off. . |
| 95/19683 | 7/1995 | WIPO . |

OTHER PUBLICATIONS

Chui, Charles R., "Wavelet Transformations and Time–Frequency Analysis", *An Introduction to Wavelets*, Academic Press, Boston,MA;pp. 49–80 (1992).

Sweldens, W. et al.,"Building your Own Wavelets at Home", *Wavelets in Computer Graphics*, ACM Siggraph Course Notes;pp. 1–30 (1996).

Mallet, S.G., "A Theory for Multiresolution Signal Decomposition: The Wavelet Representation", *IEEE Transactions on Pattern Analysis and Machine Intelligence*, vol. 11, No. 7;pp. 674–693 (Jul. 1989).

(List continued on next page.)

*Primary Examiner*—Leo H. Boudreau
*Assistant Examiner*—Kanji Patel
*Attorney, Agent, or Firm*—Gary S. Williams; Flehr Hohbach Test Albritton & Herbert LLP

[57] ABSTRACT

A data processing system and method for performing a wavelet-like transformation and a corresponding inverse wavelet-like transformation is disclosed. The wavelet-like transformation is performed on input data so as to produce decomposed data. For each set of decomposed data samples of the decomposed data, each decomposed data sample of the set is produced by computing a weighted sum of a predefined set of data samples selected from (A) subsets of the set of input data samples, (B) one or more spatially shifted subsets of the set of input data samples, (C) the sets of decomposed data samples, and (D) one or more spatially shifted sets of the sets of decomposed data samples. The weighted sum is computed using only add and bit shift operations. Similarly, the inverse wavelet-like transformation is performed on decomposed data so as to produce reconstructed data. For each subset of the set of reconstructed data, each reconstructed data sample of the subset is produced by computing a weighted sum of a predefined set of data samples selected from (A) the subsets of the set of reconstructed data samples, (B) one or more spatially shifted subsets of the subsets of reconstructed data samples, (C) the sets of decomposed data samples, and (D) one or more spatially shifted sets of the sets of decomposed data samples. The weighted sum is computed using only add and bit shift operations.

20 Claims, 14 Drawing Sheets

OTHER PUBLICATIONS

Sweldens, W., "The Lifting Scheme: A Custom–Design Constructoin of Biorthogonal Wavelets", *Applied and Computational Harmonic Analysis*, 3,pp. 186–200 (1996).

Grossman, A., et al. "Decomposition of Hardy Functions into Square Integrable Wavelts of Constant Shape ", *Siam J. Math. Anal.*, vol. 15, No., 4, pp. 723–726 (1984).

Daubechies, Ingrid, "Orthonormal Bases of Compactly Supported Wavelets", *Communications on Pure and Applied Mathematics*, vol. XLI, pp. 909–996 (1988).

Chui, C.K., "Wavelet–Based Method for Lossy Compression of Medical Image Data", Proposal Submitted to Working Group IV of ACR and NEMA;pp. 1–15 (Sep. 1995).

Bradley, J.N., "The Wavelet/Scalar Quantization Compression Standard for Digital Fingerprint Images", *Proc. IEEE ISCAS*, London, Tech. Rep. LA–UR–94–827 (1994).

Burt, P.J., et al., "Leplacian Pyramid as a Compact Image Code", *IEEE Trans. on Comms.*, vol. Com–31, 4:532–540 (Apr. 1983).

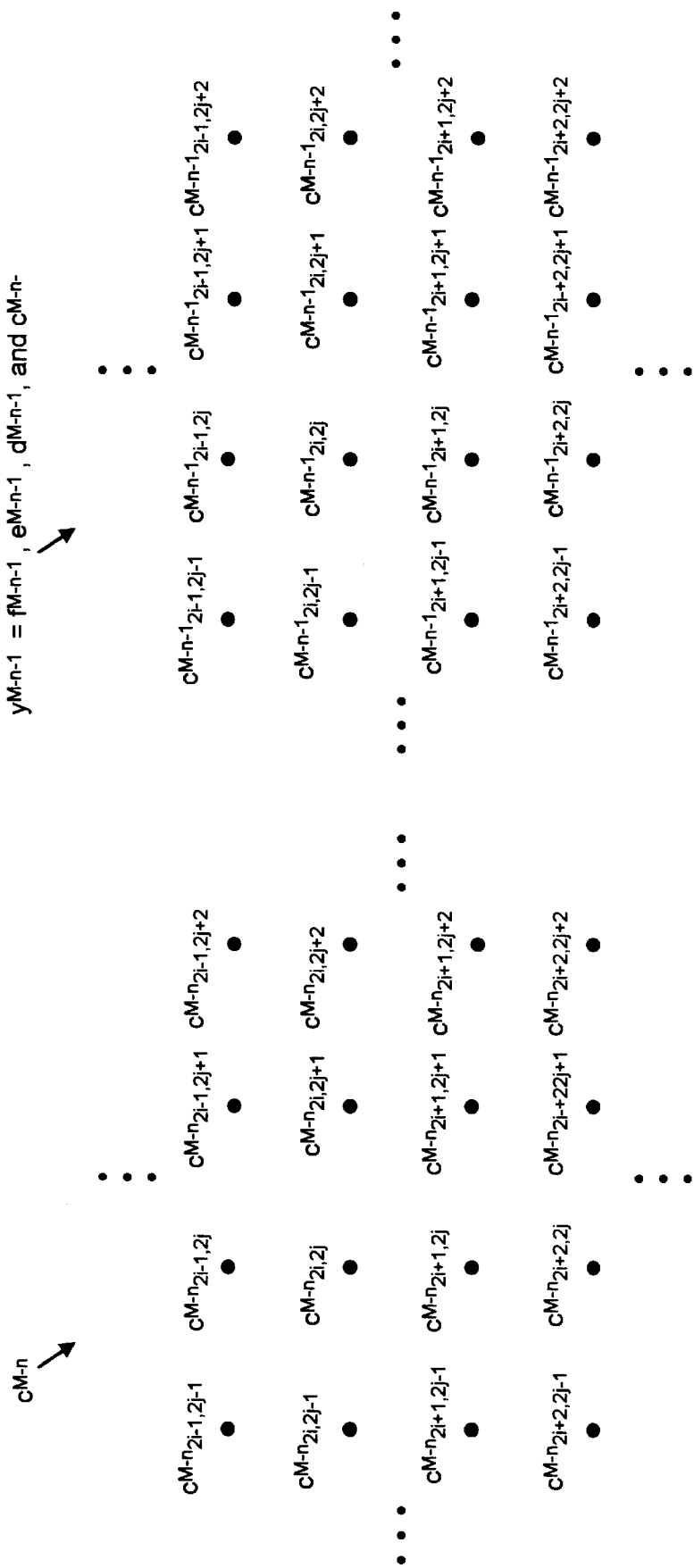

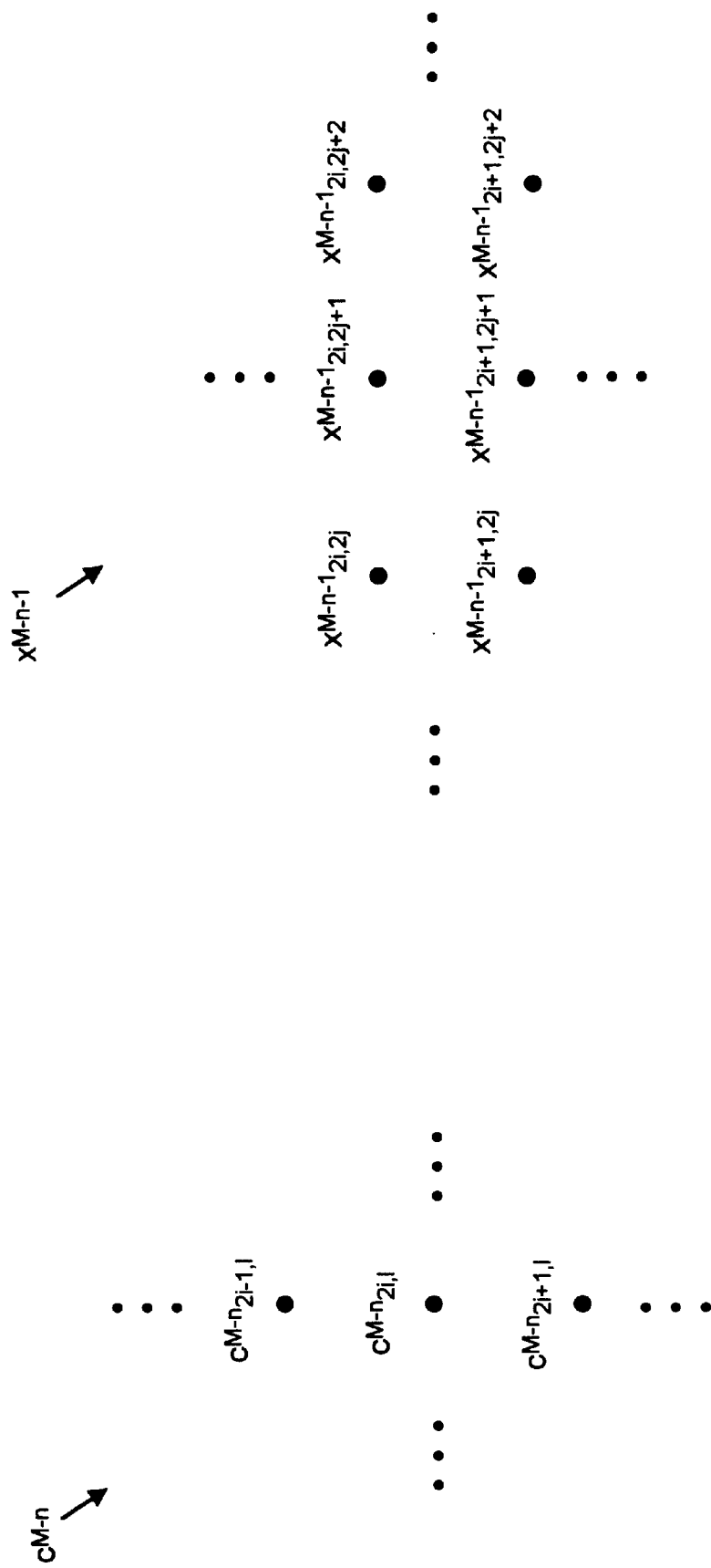

SYSTEM AND METHOD FOR PERFORMING WAVELET-LIKE AND INVERSE WAVELET-LIKE TRANSFORMATIONS OF DIGITAL DATA

The present invention relates generally to systems and methods for processing digital data. In particular, it pertains to a system and method for performing wavelet-like and inverse wavelet-like transformations of digital data, including 2-D image data and 1-D audio data, using only add and bit shift operations.

BACKGROUND OF THE INVENTION

The use of wavelet and inverse wavelet transforms is well established in MRA (multiresolution analysis) digital data processing. A special feature of this approach is that it allows narrow windowing of short duration high frequency data while also enabling wide windowing of long duration low frequency data, as generally described in Chui, C. K., "An Introduction to Wavelets", Academic Press, Boston, Mass., 1992, which is hereby incorporated by reference's as background information.

In fact, MRA wavelet and inverse wavelet transforms are particularly useful in compression and/or decompression of 2-D data that comprises a 2-D array of data samples (or elements) having vertical and horizontal dimensions, such as 2-D image data that comprises a 2-D array of data samples representing the pixels of an image. Specifically, wavelets allow short duration high spatial frequency data sample values to be narrowly windowed and longer duration low spatial frequency data sample values to be widely windowed. Compression and/or decompression of 2-D data using wavelet and inverse wavelet transforms is generally performed in the manner described in U.S. Pat. No. 5,014,134, Lawton, W. et al., "Image Compression Method and Apparatus", issued May 7, 1991, which is hereby incorporated by reference as background information.

More specifically, in compressing original 2-D data, the original data is first decomposed over one or more resolution levels using an MRA wavelet transform. For each resolution level at which a decomposition is made, input 2-D data is decomposed with the wavelet transform into LL, LH, HL, and HH component 2-D data. The date samples of the LL, LH, HL, and HH component data respectively represent the data samples of the input data in the LL spatial frequency sub-band (i.e., having data sample values with low spatial frequency in the vertical and horizontal dimensions), the LH sub-band spatial frequency (i.e., having data sample values with low spatial frequency in the vertical dimension and high spatial frequency in the horizontal dimension), the XL sub-band spatial frequency (i.e., having data sample values with high spatial frequency in the vertical dimension and low spatial frequency in the horizontal dimension), the HI-H sub-band spatial frequency (i.e., having data sample values with high spatial frequency in the vertical and horizontal dimensions). For the first resolution level at which a decomposition is made, the original data is the input data. And, at each subsequent resolution level, the LL component data from the previous decomposition is the input data. All of the LH, HL, and HH component data from each of the decompositions and the LL component data from the last decomposition form the complete decomposed data of the original data.

The complete decomposed 2-D data is then quantized to provide quantized 2-D data. This is done by quantizing the data samples of the decomposed original data so that they only have allowable integer values. Once this is done, the quantized data is then encoded so as to compress it and provide encoded (i.e., compressed) 2-D data. This is accomplished by encoding the data samples of the quantized data based on their integer quantized values. The encoding technique used is preferably a lossless encoding technique that is highly compact, such as the those disclosed in copending U.S. patent application Nos. 08/758,589 and 08/758,590 (now U.S. Pat. No. 5,748,116), entitled "SYSTEM AND METHOD FOR TREE ORDERED CODING OF SPARSE DATA SETS" and "SYSTEM AND METHOD FOR NESTED SPLIT CODING OF SPARSE DATA SETS", filed on Nov. 27, 1996, which are hereby incorporated by reference as background information. Since the quantized data samples can only have a limited number of integer values, the amount of encoding needed to represent the data samples is reduced which therefore increases the compression ratio of the data.

Conversely, decompressing encoded 2-D data of the type just described is done in reverse order to that just described. On other words, such data is first decoded to obtain decoded 2-D data. Then, the data samples of the decoded data are dequantized to provide dequantized 2-D data. The dequantized data is then reconstructed over the same resolution levels that were used in decomposing the original data. The resulting reconstructed 2-D data is produced from the LL, LH, HL, and HH component data of the dequantized data using an inverse MRA wavelet transform that corresponds to the wavelet transform used in decomposing the original data.

In decomposing and reconstructing data, most data processing systems and methods generally use quadrature mirror filters (QMF), as described in Mallat, "A Theory for Multiresolution Data Decomposition: The Wavelet Representation", U. Penn. Report No. MS-CIS-87-22, 1987, for each corresponding resolution level at which this is done. Each QMF performs a decomposition or reconstruction at a corresponding resolution level with a set of separate low pass and high pass convolution filters.

However, since the low pass and high pass convolution filters of QMFs are separate, they do not share data with each other in computing their outputs. Moreover, these low pass and high pass convolution filters use multipliers to produce the LL, LH, HL, and HH component data described earlier. And, in QMFs used in decomposing original data, down sampling of data samples occurs only after the low pass and high pass convolution filters have processed the data samples of the data. Thus, these QMFs waste time processing data samples which are later discarded. Similarly, in QMFs used in reconstructing decomposed data, up sampling of data samples occurs before the low pass and high pass convolution filters process the data samples. Since the up sampled data samples have values of zero, these QMFs waste time processing these up sampled data samples.

SUMMARY OF THE INVENTION

In summary, the present invention is a data processing system that includes a wavelet-like transform generator that performs a wavelet-like transformation of input data into decomposed data using a corresponding method. The input data comprises a set of input data samples and the decomposed data comprises sets of decomposed input data samples. On performing the wavelet-like transformation, the set of input data samples are deinterleaved to produce subsets of the set of input data samples. In doing so, one or more of the subsets of the set of input data samples are spatially shifted in one or more spatial dimensions to produce one or more spatially shifted subsets of the set of input data samples. Similarly, one or more of the sets of decomposed data samples are spatially shifted in one or more spatial dimensions to produce one or more spatially shifted sets of decomposed data samples. And, for each of the sets of decomposed data samples, each of the decomposed data samples of the set is produced by computing a weighted sum of a predefined set of data samples selected from (A) the subsets of the set of input data samples, (B) the one or more spatially shifted subsists of the input data samples, (C) the sets of decomposed data samples, and (D) the one or more spatially shifted sets of decomposed data samples. The weighted sum is computed using only add and bit shift operations.

Furthermore, the data processing system includes an inverse wavelet-like transform generator that performs an inverse wavelet-like transformation of decomposed data into reconstructed data using a corresponding method. The decomposed data comprises sets of decomposed data samples and the reconstructed data comprises a set of reconstructed data samples. On doing so, one or more of the sets of decomposed data samples are spatially shifted in one or more spatial dimensions to produce one or more spatially shifted sets of decomposed data samples. Similarly, one or more subsets of the set of reconstructed data samples are shifted in one or more spatial dimensions to produce one or more spatially shifted subsets of the set of reconstructed data samples. And, for each of the subsets of the set of reconstructed data samples, each of the reconstructed data samples of the subset is produced by computing a weighted sum of a predefined set of data samples selected from (A) the subsets of the set of reconstructed data samples, (B) the one or more spatially shifted subsets of reconstructed data samples, (C) the sets of decomposed data samples, and (D) the one or more spatially shifted sets of decomposed data samples. The weighted sum is computed using only add and bit shift operations. Then, the subsets of reconstructed data samples are interleaved to produce the set of reconstructed data samples.

BRIEF DESCRIPTION OF THE DRAWINGS

Additional objects and features of the invention will be more readily apparent from the following detailed description and appended claims when taken in conjunction with the drawings, in which:

FIG. 6 provides an illustration off the data samples of the input 2-D data which are decomposed by the decomposition filter of FIG. 5;

FIG. 7 provides an illustration of the data samples of the decomposed 2-D data which are produced by the decomposition filter of FIG. 5;

FIG. 9 provides an illustration of the data samples of the input 2-D data which are decomposed in the vertical dimension by the decomposition filter of FIGS. 8a and 8b;

FIG. 10 provides an illustration of the data samples of the intermediate decomposed 2-D data which were produced by the decomposition filter of FIGS. 8a and 8b;

DESCRIPTION OF THE PREFERRED EMBODIMENTS

Figure 1:
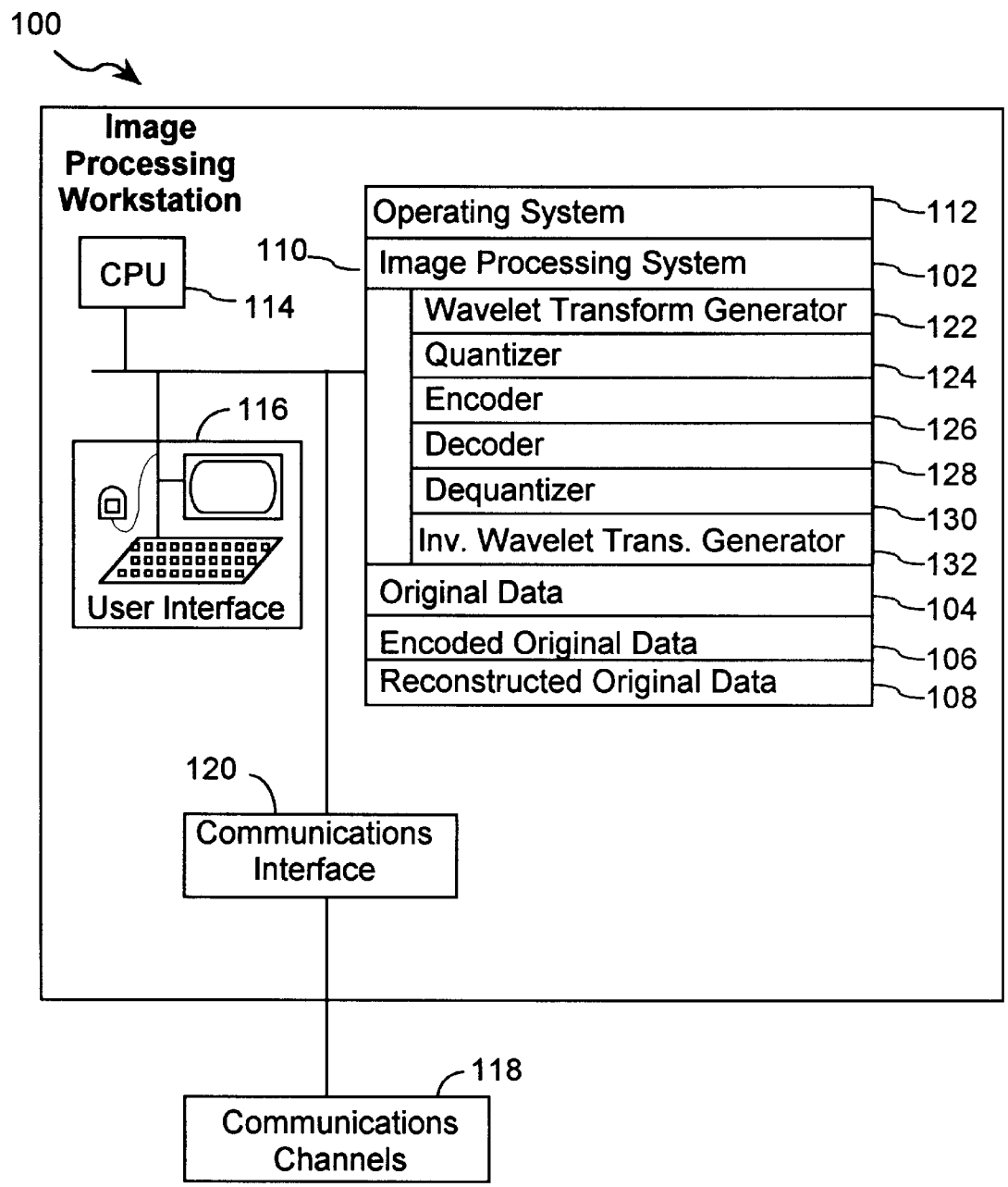
FIG. 1 is a block diagram of a data processing workstation with a software implemented data processing system in accordance with the present invention.

Referring to FIG. 1, there is shown a data processing workstation 100 with a software embodiment of a data processing system 102. As will be described in greater detail shortly, the data processing system 102 uses a novel MRA wavelet-like transform to decompose original (i.e., raw) digital data. This data may be 1-D data, such as audio data, and/or 2-D data, such as image data. This date is then quantized and encoded by the date processing system to produce encoded (i.e., compressed) data. In addition, the date processing system decodes and dequantizes this data or other data that has been eternally decomposed, quantized, and encoded in the same way. It then uses a novel MRA inverse wavelet-like transform corresponding to the wavelet-like transform just mentioned to reconstruct this decoded and dequantized data to produce reconstruct (i.e., decompressed) data.

The data processing workstation 100 includes a memory 110. The memory stores an operating system 112 and the data processing system 102. The operating system and the date processing system are run on the CPU 114 of the workstation. The operating system controls and coordinates running of the data processing system in response to commands issued by a user with the user interface 116 of the workstation.

The original data and the encoded data produced externally is received by the data processing workstation 100 from an external source (not shown) over external communications channels 118 via the communications interface 120. This data is then stored in the memory locations 104 avid 106, respectively, by the operating system 112. Similarly, the encoded data that is produced by the data processing system 102 is stored in the memory location 1 06 and may be retrieved by the operating system and transmitted to external destinations (not shown). This is done over the communications channels via the communications interface. These operations are all done in response to commands issued by the user with the user interface 116.

When the user wishes to compress original data, the user issues appropriate commands with the user interface to invoke the data processing system 102 and select the data. The selected data is then compressed by the data processing system in the manner discussed next.

Figure 2:
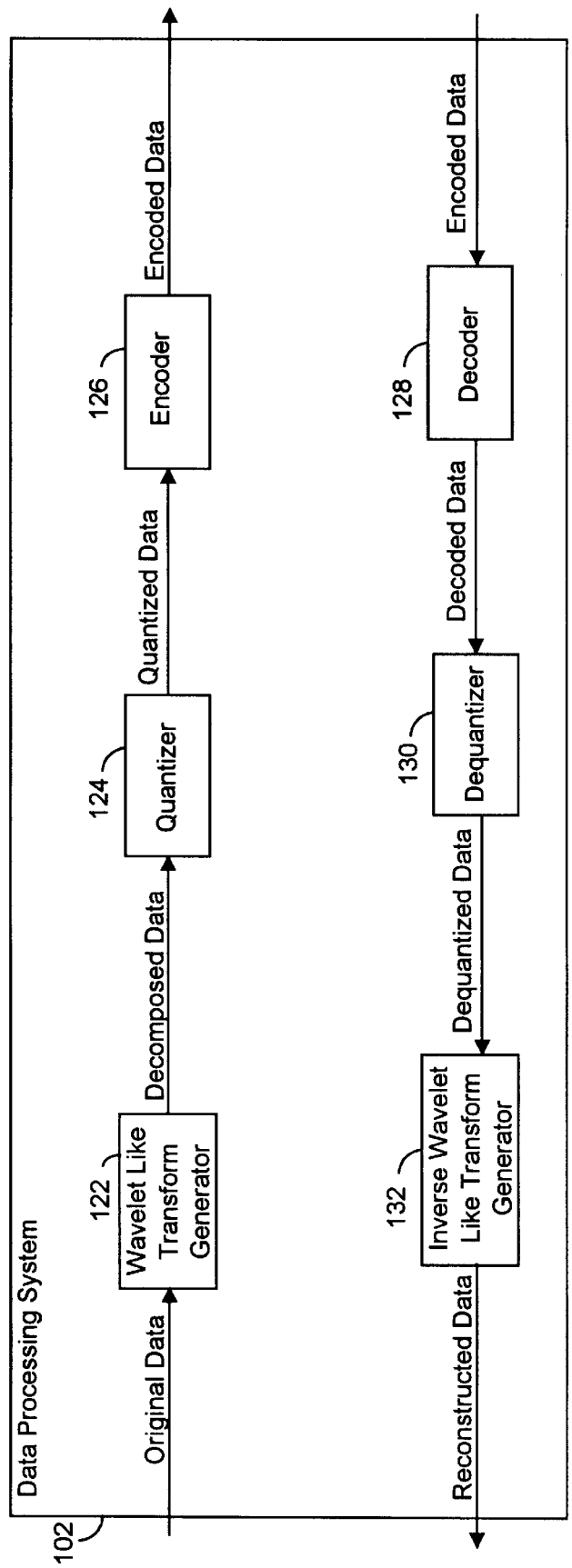
FIG. 2 is a block diagram of the data processing system of FIG. 1.

Referring to FIG. 2, the wavelet-like transform generator 122 of the data processing system 102 retrieves the selected original data from the memory location 106 and decomposes to form decomposed data. This is done using the novel wavelet-like transform mentioned earlier and which will be discussed shortly.

Then, the decomposed data is quantized by the quantizer 124 of the data processing system 102 to produce quantized data. The quantizer quantizes the decomposed data by quantizing its data samples to predefined allowable integer values. This may be done using well known scaler quantization techniques, such as that described in A. Gersho and R. M. Gray, "Vector Quantization and Signal Compression", Kiuwer Academic Publishers, Boston, Mass., 1992, which is hereby incorporated by reference as background information.

The encoder 126 of the data processing system 102 then encodes the quantized data so that it is compressed and forms encoded data. This may be done by encoding the quantized data samples of the quantized data based on their quantized integer values using a lossless and highly compact encoding technique, such as the those disclosed in U.S. patent application Ser. Nos. 08/758,589 and 08/758,590, referred to earlier. The encoder then stores the encoded data in the memory location 106.

Referring to FIG. 1, conversely when the user wishes to decompress encoded data, the user issues appropriate commands with the user interface to invoke the data processing system and select the encoded data. The data processing system then decompresses the selected encoded data in the manner discussed next.

Referring to FIG. 2, the decoder 128 of the data processing system 102 retrieves the encoded data from the memory location 106 and decodes it to produce decoded data that is decomposed and quantized. The decoder does this by decoding the encoded data samples of the encoded data using a decoding technique corresponding to the encoding technique described earlier.

Then, the decoded data is dequantized by the dequantizer 130 of the data processing system 102 to produce dequantized data that is still decomposed. This is done by dequantizing the quantized data samples of the decoded data from their predefined allowable integer values to dequantized values. In doing so, the dequantizer uses a dequantization technique corresponding to the quantization technique mentioned earlier.

The dequantized data is then reconstructed by the inverse wavelet-like transform generator 132 to produce reconstructed data. The inverse wavelet-like transform generator reconstructs the dequantized data. This is done using the novel inverse wavelets-like transform that was mentioned earlier and which will be described shortly. This inverse wavelet-like transform corresponds to the wavelet-like transform mentioned earlier. The reconstructed data is then stored in the memory location 108 by the inverse wavelet-like transform generator.

2-D Wavelet-Like Transformation

As discussed earlier, the original data selected to be compressed may be 2-D data that comprises a 2-D array of data samples. The array of data samples of each of such 2-D data has rows of data samples in one spatial dimension, the vertical dimension, and columns of data samples, in another spatial dimension, the horizontal dimension. Each data sample has a value representing a physical property. For example, when the 2-D data is image data comprising a 2-D array of data samples representing pixels of an image, the value of each data sample represents the intensity level of the corresponding pixel in the image.

Figure 3:
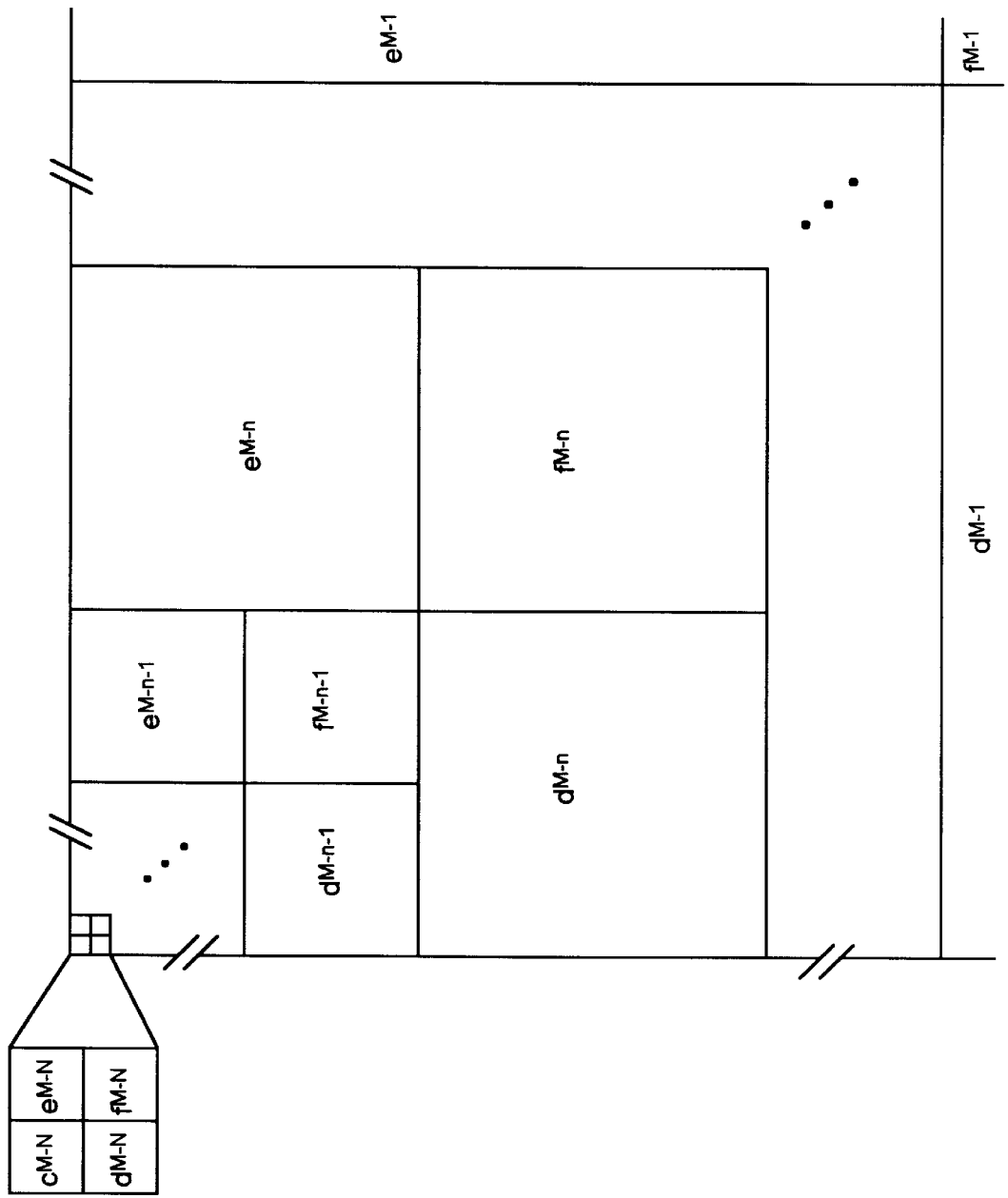
FIG. 3 is an illustration of how original 2-D data is decomposed into HH, HL, LH, and LL component 2-D data by the data processing system of FIG. 2.
Figure 4:
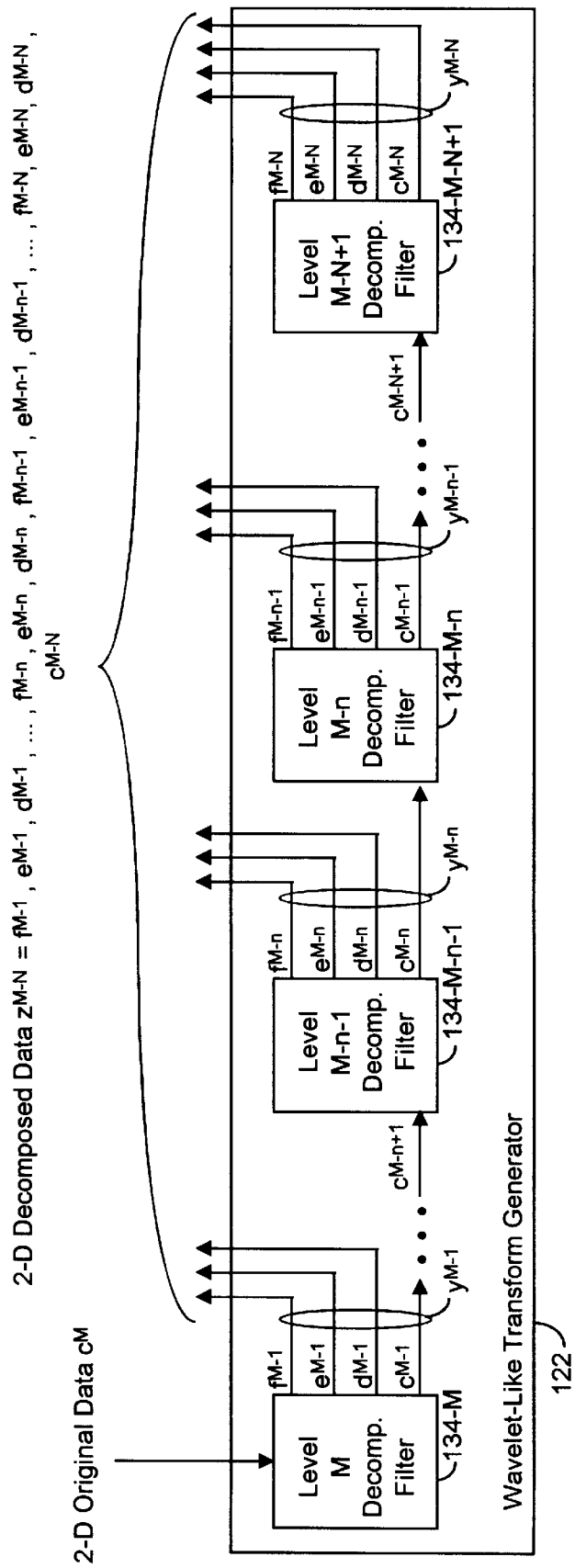
FIG. 4 is a block diagram of the wavelet-like transform generator of the data processing system of FIG. 2.

Referring now to FIGS. 3 and 4, similar to conventional wavelet transform generators, the wavelet-like transform generator 122 can be used to decompose original 2-D data $c^M$ in an MRA 2-D space using an MRA 2-D wavelet-like transform over N resolution levels $\{M-n\}$, where $N \geq 1$, M represents the resolution level of the original data, n=0 to N−1 and represents the nth decomposition which occurs at the resolution level M−n, and N also represents the number of decompositions. And, like conventional wavelet transform generators, the wavelet-like transform generator has a corresponding decomposition filter 134-M−n for each resolution level M−n at which a decomposition is made.

Thus, at each resolution level M−n at which a decomposition is made, input 2-D data $c^{M-n}$ provided to the corresponding level M−n decomposition filter 134-M−n is decomposed using the wavelet-like transform into LL, LH, HL, and HH component 2-D data $c^{M-n-1}$, $d^{M-n-1}$, $e^{M-n-1}$, and $f^{M-n-1}$, respectively. The LL, LH, HL, and HH component data comprise respective 2-D arrays of data samples. The data samples of the LL, LH, HL, and HH component data respectively represent the data samples of the input data in the LL spatial frequency sub-band, the LH spatial frequency sub-band, the HL spatial frequency sub-band, and the HH spatial frequency sub-band. Furthermore, the LL, LH, HL, and HH component data form the decomposed data $y^{M-n-1}$ of the input data. Thus, at the first resolution level M at which this is done, the original data is the input date $c^M$ to the level M decomposition filter 134-M. And, at each subsequent resolution level M−n, the LL component data $C^{M-n}$ from the previous resolution level M−n−1 is the input data to the corresponding level M−n decomposition filter 134-M−n. As a result, the complete decomposed 2-D data $z^{M-N}$ of the original data comprises the HH, HL and LH component data $\{f^{M-1}, e^{M-1}, d^{M-1}, \ldots, f^{M-n}, e^{M-n}, d^{M-n}, f^{M-n-1}, e^{M-n-1}, d^{M-n-1}, \ldots f^{M-N}, e^{M-N}, d^{M-N}\}$ from the N decompositions made over the N resolution levels and the LL component data $c^{M-N}$ produced at the last resolution level M−N+1 by the level M−N+1 decomposition filter 134-M−N+1.

Figure 5:
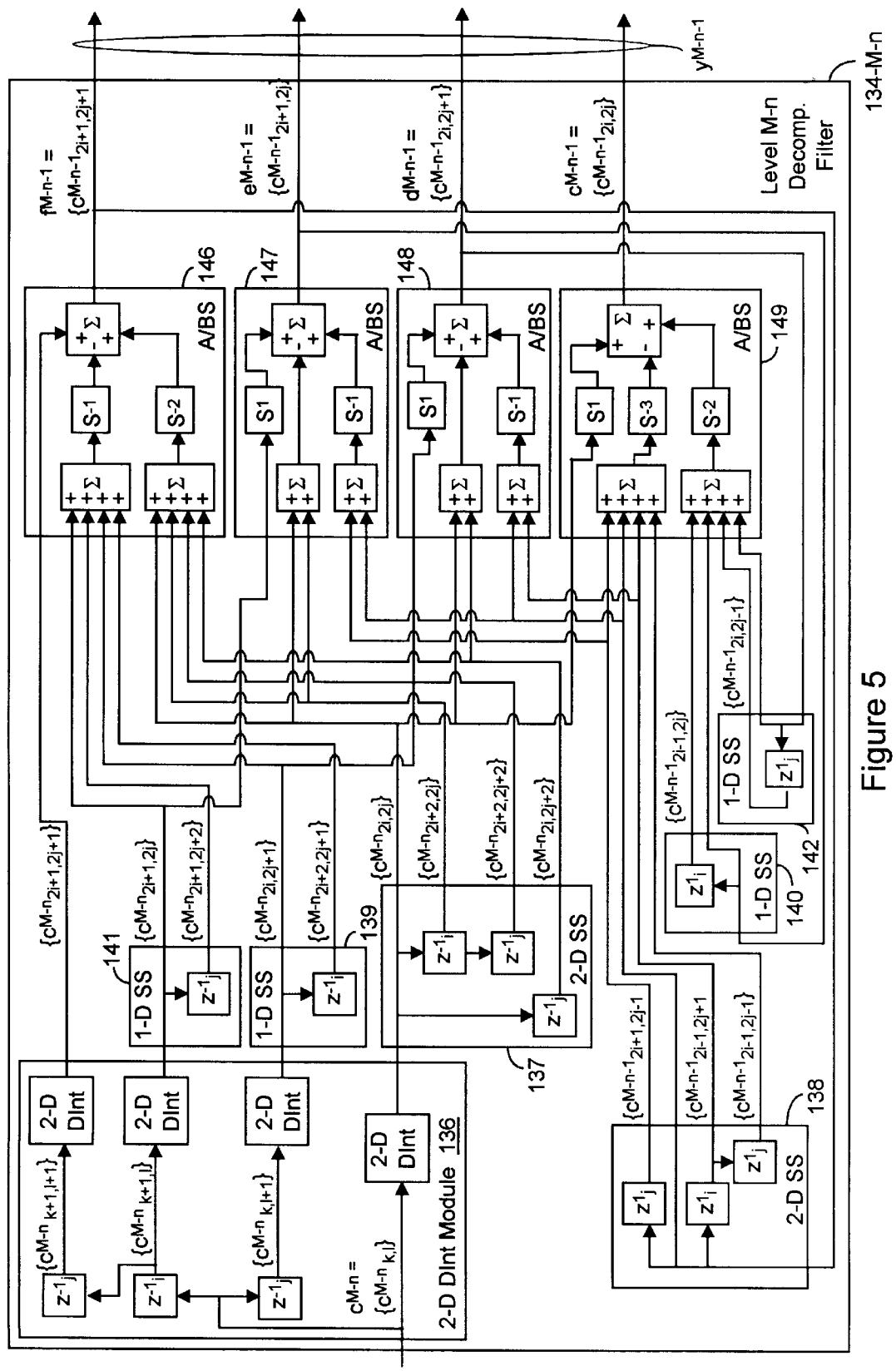
FIG. 5 provides one embodiment of each decomposition filter of the wavelet-like transform generator of FIG. 4 for decomposing input 2-D data.

FIG. 5 shows one embodiment of the decomposition filter 134-M−n for each resolution level M−n. The set of input data samples $\{c^{M-n}_{k,l}\}$ of the corresponding input 2-D data $c^{M-n}$ are provided to the decomposition filter 134-M−n, where for each k=0 to K−1, l=0 to L−1, k and l are indexes respectively in the vertical and horizontal dimensions, $K=2^{M-n}$ and represents the number of data samples in the vertical dimension in each column of the 2-D array of the input data, and $L=2^{M-n}$ represents the number of data samples in the horizontal dimension in each row of the array. In response, the decomposition filter produces the sets of decomposed data samples $\{c^{M-n}_{2i,2j}\}$, $\{(c^{M-n}_{2i+1,2j}\}$, $\{c^{M-n}_{2i,2j+1}\}$, and $\{c^{M-n}_{2i,2j+1}\}$, and $\{c^{M-n}_{2i+1,2j+1}\}$ of the LL, LH, HL, and HH component 2-D data $c^{M-n-1}$, $d^{M-n-1}$, $e^{M-n-1}$, $e^{M-n-1}$, and $f^{M-n-1}$, respectively, which form the decomposed 2-D date $y^{M-n-1}$ of the input data, as shown in FIG. 7.

Referring to FIGS. 5–7, the decomposition filter 134-M−n includes a 2-D deinterleaving (i.e., multiplexing or switching) module (2-D DInt Module) 136. The deinterleaving module deinterleaves (i.e., multiplexes or switches) the set of input data samples $\{c^{M-n}_{k,l}\}$ of the input data $c^{M-n}$ in the vertical and horizontal dimensions (i.e., in 2-D) to produce the subsets of input date samples $\{(c^{M-n}_{2i,2j}\}$, $\{c^{M-n}_{2i,2j+1}\}$, $\{c^{M-n}_{2i+1,2j}\}$, and $\{^{M-n}_{2i+1,2j+1}\}$ of the set of input data samples $\{c^{M-n}_{k,l}\}$.

Specifically, the 2-D deinterleaving modules 136 includes vertical and horizontal dimension spatial shifters (e.g., delays) ($z^{-1}{}_k$ and $z^{-1}{}_l$) that respectively spatially shift (e.g., delay) the set of input data samples $\{c^{M-n}{}_{k,l}\}$ of the input data $c^{M-n}$ down by one data sample in the vertical and horizontal dimensions to produce the spatially shifted sets of input data samples $\{c^{M-n}{}_{k,l+1}\}$ and $\{c^{M-n}{}_{k+1,l}\}$ of the input data. Additionally, the deinterleaving module includes another horizontal dimension spatial shifter ($z^{-1}{}_l$) that spatially shifts the shifted set of input data samples $\{c^{M-n}{}_{k+1,l}\}$ down by one data sample in the horizontal dimension to produce the spatially shifted set of input data samples $\{c^{M-n}{}_{k+1,l+1}\}$ of the input data.

However, in spatially shifting sets of data samples in a spatial dimension, the original set of data samples does not actually include some of the data samples that are to be in the spatially shifted set of data samples. Thus, each of the spatial shifters ($z^{-1}{}_k$ and $z^{-1}{}_l$) described throughout this document that shift an original set of data samples down by one data sample in a spatial dimension, duplicate (i.e., reflect) the date samples of the original set of data samples with the highest index in the spatial dimension and add these data samples to the spatially shifted set of data samples as these data samples with the highest index in the spatial dimension. Similarly, each of the spatial shifters ($z^1 k$ and $z^1$) described throughout this document that shift an original set of data samples up by one data sample in a spatial dimension, duplicate (i.e., reflect) the data samples of the original set of data samples with the lowest index in the spatial dimension and add these data samples to the spatially shifted set of data samples as the data samples with the lowest index in the spatial dimension.

Returning to the discussion of the 2-D deinterleaving module 136, it includes respective 2-D deinterleavers (e.g., downsamplers, multiplexers, or switches) (2-D DInt) that deinterleave (e.g., downsample, multiplex, or switch) the sets of input data samples $\{c^{M-n}{}_{k,l}\}$, $\{c^{M-n}{}_{k,l+1}\}$, $\{c^{M-n}{}_{k+1,l}\}$, and $\{c^{M-n}{}_{k+1,l+1}\}$ in both the vertical and horizontal dimensions to produce the subsets of input data samples $\{c^{M-n}{}_{2i,2j}\}$, $\{c^{M-n}{}_{2i,2j+1}\}$, $\{c^{M-n}{}_{2i+1,2j}\}$, and $\{c^{M-n}{}_{2i+1,2j+1}\}$. The input data samples $\{c^{M-n}{}_{2i,2j}\}$ comprise those of the input data samples $\{c^{M-n}{}_{k,l}\}$ of the input data $c^{M-n}$ that have even vertical and horizontal indexes k=2i and l=2j. The input data samples $\{c^{M-n}{}_{2i+1,2j}\}$ comprise those of the input data samples $\{c^{M-n}{}_{k,l}\}$ of the input data $c^{M-n}$ that have odd vertical indexes k=2i+1 and even horizontal indexes l=2j such that each data sample $c^{M-n}{}_{2i+1,2j}$ is spatially adjacent to the data sample $c^{M-n}{}_{2i,2j}$ in the input data $c^{M-n}$ by one data sample in the vertical dimension. Similarly, the input date samples $\{c^{M-n}{}_{2i,2j+1}\}$ comprise those of the input data samples $\{c^{M-n}{}_{k,l}\}$ of the input data $c^{M-n}$ that have even vertical indexes k=2i and odd horizontal indexes l=2j+1 such that each data sample $c^{M-n}{}_{2i,2j+1}$ is spatially adjacent to the data sample $c^{M-n}{}_{2i,2j}$ in the input data by one data sample in the horizontal dimension. And finally, the input data samples $\{c^{M-n}{}_{2i+1,2j+1}\}$ comprise those of the input data samples $\{c^{M-n}{}_{k,l}\}$ of the input data $\{c^{M-n}$ that have odd vertical and horizontal indexes k=2i+1 and l=2j+1 such that each date sample $c^{M-n}{}_{2i+1,2j+1}$ is spatially adjacent to the data sample $c^{M-n}{}_{2i,2j}$ in the input data by one data sample in both the vertical and horizontal dimensions.

The decomposition filter also includes a 2-D spatial shift module (2-D SS) 137. This spatial shift module spatially shifts the subset of input data samples $\{c^{M-n}{}_{2i,2j}\}$ of the input data $c^{M-n}$ in the vertical and horizontal dimensions to produce the spatially shifted subsets of input data samples $\{c^{M-n}{}_{2i+2,2j}\}$, $\{c^{M-n}{}_{2i,2j+2}\}$, and $\{c^{M-n}{}_{2i+2,2j+2}\}$. To do so, the spatial shift module includes vertical and horizontal dimension spatial shifters ($z^{-1}{}_{2i}$ and $z^{-1}{}_{2j}$) that respectively spatially shift the subset of input data samples $\{c^{M-n}{}_{2i,2j}\}$ down by one data sample in the vertical and horizontal dimensions to produce the spatially shifted subsets of input data samples $\{c^{M-n}{}_{2i+2,2j}\}$ and $\{c^{M-n}{}_{2i,2j+2}\}$. Additionally, the decomposition filter includes a horizontal dimension spatial shifter ($z^{-1}{}_{2j}$) that spatially shifts the subset of input data samples $\{c^{M-n}{}_{2i+2,2j}\}$ down by one data sample in the horizontal dimension to produce the subset of input data samples $\{c^{M-n}{}_{2i+2,2j+2}\}$.

The input (data samples $\{c^{M-n}{}_{2i+2,2j}\}$ comprise those of the input data samples $\{c^{M-n}{}_{k,l}\}$ of the input data $c^{M-n}$ that have ever vertical and horizontal indexes k=2i+2 and l=2j such that each data sample $\{c^{M-n}{}_{2i+2,2j}$ is spatially adjacent to the data sample $\{c^{M-n}{}_{2i,2j}$ in the input data $c^{M-n}$ by two data samples in the vertical dimension. Similarly, the input data samples $\{c^{M-n}{}_{2i,2j+2}\}$ comprise those of the input data samples of the input data that have even vertical and horizontal indexes k=2i and l=2j+2 such that each of these data samples $\{c^{M-n}{}_{2i,2j+2}\}$ is spatially adjacent to the data sample $\{c^{M-n}{}_{2i,2j}$ in the input data by two data samples in the horizontal dimension. And, the input data samples $\{c^{M-n}{}_{2i+2,2j+2}\}$ comprise those of the input data samples of the input data that have even vertical and horizontal indexes k=2i+2 and l=2j+2 such that each of these data samples $\{c^{M-n}{}_{2i+2,2j+2}$ is spatially adjacent to the data sample $\{c^{M-n}{}_{2i,2j}$ in the input data by two data samples in both the vertical and horizontal dimensions.

The decomposition filter further includes a 1-D spatial shift module (1-D SS) 139. This spatial shift module spatially shifts the subset of input data samples $\{c^{M-n}{}_{2i,2j+1}\{$ of the input data $c^{M-n}$ down by one data sample in the vertical dimension to produce the spatially shifted subset of input data samples $\{c^{M-n}{}_{2i+2,2j+1}\}$. This is done with a vertical dimension spatial shifter ($z^{-1}{}_k$). The input data samples $\{c^{M-n}{}_{2i+2,2j+1}\}$ comprise those of the input data samples $\{c^{M-n}{}_{k,l}\}$ of the input data that have even vertical indexes k=2i+2 and odd horizontal indexes l=2j+1 such that each data sample $\{c^{M-n}{}_{2i+2,2j+1}$ is spatially adjacent to the sample $c^{M-n}{}_2 1,2$ in the input data $c^{M-n}$ by two data samples in the vertical dimension and one data sample in the horizontal dimension.

The decomposition filter also includes a similar 1-D spatial shift module (1-D SS) 141. This spatial shift module spatially shifts the subset of input data samples $\{c^{M-n}{}_{2i+1,2j}\}$ of the input data $c^{M-n}$ down by one data sample in the horizontal dimension to produce the spatially shifted subset of input data samples $\{c^{M-n}{}_{2i+1,2j+2}\}$. This is done with a horizontal dimension spatial shifter ($z^{-1}{}_{2j}$). The input data samples $\{c^{M-n}{}_{2i+1,2j+2}\}$ comprise those of the input data samples $\{c^{M-n}{}_{k,l}\}$ the input data that have odd vertical indexes k=2i+1 and even horizontal indexes l=2j+2 such that each data sample $c^{M-n}{}_{2i+1,2j+2}$ is spatially adjacent to the data sample $c^{M-n}{}_{2i,2j}$ in the input data $c^{M-n}$ by one data sample in the vertical dimension and two data samples in the horizontal dimension.

In the decomposition filter 134-M–n, the subsets of input data samples $\{c^{M-n}{}_{2i,2j}\}$, $\{c^{M-n}{}_{2i,2j+1}\}$, $\{c^{M-n}{}_{2i+1,2j}\}$, $\{c^{M-n}{}_{2i+1,2j+1}\}$, $\{c^{M-n}{}_{2i+2,2j+2}\}$, $\{c^{M-n}{}_{2i+2,2j}\}$, $\{c^{M-n}{}_{2i,2j+2}\}$, $\{c^{M-n}{}_{2i+1,2j+2}\}$, and $\{c^{M-n}{}_{2i+2,2j+1}\}$ are processed in both the verticle and horizontal dimensions by the 2-D add/bit shifter (A/BS) 146. This produces the set of decomposed data samples $\{c^{M-n-1}{}_{2i+1,2j+1}\}$ of the HH component data $f^{M-n-1}$ of the input date $c^{M-n}$ which comprise those of the input date samples $\{c^{M-n-1}{}_{l,k}\}$ of the decomposed data $y^{M-n-1}$ that have odd vertical and horizontal indexes k=2i+1 and l=2j+1.

More specifically, the add/bit shifter 146 produces each decomposed data sample $c^{M-n-1}_{2i+1,2j+1}$ in the HH component data $f^{M-n-1}$ according to:

$$c^{M-n-1}_{2i+1,2j+1} =$$  Equation 1

$$c^{M-n}_{2i+1,2j+1} - S^{-1}(c^{M-n}_{2i,2j+1} + c^{M-n}_{2i+1,2j} + c^{M-n}_{2i+2,2j+1} + c^{M-n}_{2i+1,2j+2}) +$$

$$S^{-2}(c^{M-n}_{2i,2j} + c^{M-n}_{2i+2,2j} + c^{M-n}_{2i,2j+2} + c^{M-n}_{2i+2,2j+2})$$

where $S^{-1}$ denotes shifting each bit one bit over so as to divide by 2 and $S^{-2}$ denotes shifting each bit 2 bits over so as to divide by 4. Thus, the subset of input data samples $\{c^{M-n}_{2i+1,2j+1}\}$ of the input data $c^{M-n}$ are selected to correspond to the set of decomposed data samples $\{c^{M-n-1}_{2i+1,2j+1}\}$ of the HH component data so that there is a corresponding data sample $c^{M-n}_{2i+1,2j+1}$ in the input data for each data sample $c^{M-n-1}_{2i+1,2j+1}$ of the HH component data. And, each decomposed data sample in the HH component data is the weighted shifted sum (i.e., bit shifted sum or linear combination) of the corresponding input data sample in the input data and the input data samples $c^{M-n}_{2i,2j}$, $c^{M-n}_{2i,2j+1}$, $c^{M-n}_{2i+1,2j}$, $c^{M-n}_{2i+2,2j+2}$, $c^{M-n}_{2i+2,2j}$, $c^{M-n}_{2i+2,2j}$, $c^{M-n}_{2i,2j+2}$, $c^{M-n}_{2i+1,2j+2}$, and $c^{M-n}_{2i+2,2j+1}$ that are vertically and/or horizontally adjacent to the corresponding input data sample in the input data. The add/bit shifter includes adders ($\Sigma$) and bit shifters ($S^{-1}$ and $S^{-2}$) that together compute this weighted sum by using only add (including subtract) and bit shift operations.

The decomposition filter 134-M–n includes a 2-D spatial shift (i.e., advance) module (2-D SS) 138. This spatial shift module spatially shifts (i.e., advances) the set of decomposed data samples $\{c^{M-n-1}_{2i+1,2j+1}\}$ of the HH component data $f^{M-n-1}$ in the vertical and horizontal dimensions to produce the spatially shifted sets of decomposed data samples $\{c^{M-n-1}_{2i-1,2j+1}\}$, $\{c^{M-n-1}_{2i+1,2j-1}\}$, and $\{c^{M-n-1}_{2i-1,2j-1}\}$. To do so, the spatial shift module includes vertical and horizontal dimension spatial shifters ($z_1^{2i+1}$ and $z^1_{2j+1}$) that respectively spatially shift the set of decomposed data samples $\{c^{M-n-1}_{2i+1,2j+1}\}$ up by one data sample in the vertical and horizontal dimension to produce the spatially shifted sets of decomposed data samples $\{c^{M-n-1}_{2i-1,2j+1}\}$ and $\{c^{M-n-1}_{2i+1,2j-1}\}$. And, the spatial shift module includes a horizontal dimension spatial shifter ($z^1_{2j-1}$) that spatially shifts the set of decomposed date samples $\{c^{M-n-1}_{2i-1,2j+1}\}$ up by one data sample in the horizontal dimension to produce the set of decomposed data samples $\{c^{M-n-1}_{2i-1,2j-1}\}$.

The set of decomposed data samples $\{c^{M-n-1}_{2i+1,2j-1}\}$ comprise those of the data samples $\{c^{M-n}_{l,k}\}$ of the decomposed data $y^{M-n-1}$ that have odd vertical and horizontal indexes k=2i+1 and l=2j−1. And, the set of decomposed data samples $\{c^{M-n-1}_{2i-1,2j+1}\}$ comprise those of the data samples of the decomposed data that have odd vertical and horizontal indexes k=2i−1 and l=2j+1. Finally, the set of decomposed data samples $\{c^{M-n-1}_{2i-1,2j-1}\}$ comprise those of the data samples of the decomposed data that have odd vertical and horizontal indexes k=2i−1 and l=2j−1. As a result, each data sample $c^{M-n-1}_{2i+1,2j-1}$, $c^{M-n-1}_{2i-1,2j+1}$, and $c^{M-n-1}_{2i-1,2j-1}$ is spatially adjacent to the decomposed data sample $c^{M-n-1}_{2i,2j}$ in the decomposed data by one data sample in both the vertical and horizontal dimensions.

The subsets of input data samples $\{c^{M-n}_{2i,2j}\}$, $\{c^{M-n}_{2i+1,2j}\}$, and $\{c^{M-n}_{2i+2,2j}\}$ and the sets of decomposed data Samples $\{c^{M-n-1}_{2i+1,2j+1}\}$ and $\{c^{M-n-1}_{2i+1,2j-1}\}$ of the HH component data $f^{M-n-1}$ are processed in both the vertical and horizontal dimensions by the 2-D add/bit shifter (A/BS) 147 of the decomposition filter 134-M–n. This produces the set of decomposed data samples $\{c^{M-n-1}_{2i+1,2j}\}$ of the HL component data $e^{M-n-1}$ of the input data $c^{M-n}$ which comprise those of the data samples $\{c^{M-n-1}_{l,k}\}$ of the decomposed data $y^{M-n-1}$ that have odd vertical indexes k=2i+1 and even horizontal indexes l=2j.

The add/bit shifter 147 does this by producing each decomposed data sample $c^{M-n-1}_{2i+1,2j}$ of the HL component data $e^{M-n-1}$ according to:

$$c_{2i+1,2j}{}^{M-n-1} = S^1 c_{2i+1,2j}{}^{M-n} - (c_{2i,2j}{}^{M-n} + c_{2i+2,2j}{}^{M-n}) + S^{-1}(c_{2i+1,2j-1}{}^{M-n-1} + c_{2i+1,2j+1}{}^{M-n-1})$$  Equation 2 where $S^1$ denotes shifting each bit one bit over so as to multiply by 2. On this case, the subset of input data samples $\{c^{M-n}_{2i+1,2j}\}$ of the input data $c^{M-n}$ are selected to correspond to the set of decomposed data samples $\{c^{M-n-1}_{2i+1,2j}\}$ of the HL component data so that there is a corresponding data sample $c^{M-n}_{2i+1,2j}$ in the input data for each data sample $c^{M-n}_{2i+1,2j+1}$ of the HL component data. And, each decomposed data sample of the HL component data is the weighted sum of the corresponding input data sample in the input data, the input data samples $c^{M-n}_{2i+2,2j}$ and $c^{M-n}_{2i,2j}$ that are vertically adjacent to the corresponding input data sample in the input data, and the decomposed data samples $c^{M-n-1}_{2i+1,2j-1}$ and $c^{M-n-1}_{2i+1,2j+1}$ that correspond to the input data samples $c^{M-n}_{2i+1,2j-1}$ and $c^{M-n}_{2i+1,2j+1}$ that are horizontally adjacent to the corresponding input data sample in the input data. The add/bit shifter 164 includes adders ($\Sigma$) and bit shifters ($S^1$ and $S^{-1}$) for computing this weighted sum by using only add (including) and bit shift arithmetic operations.

Similarly, the subsets of input data samples $\{c^{M-n}_{2i,2j}\}$, $\{c^{M-n}_{2i,2j+1}\}$, and $\{c^{M-n}_{2i,2j+2}\}$ and the sets of decomposed data samples $\{c^{M-n-1}_{2i+1,2j+1}\}$ and $\{c^{M-n-1}_{2i-1,2j+1}\}$ of the HH component data $f^{M-n-1}$ are processed in both the vertical and horizontal dimensions by the 2-D add/bit shifter (A/BS) 148 of the decomposition filter 134-M–n. This produces the set of decomposed data samples $\{c^{M-n-1}_{2i,2j+1}\}$ of the LH component data $d^{M-n-1}$ of the input data $c^{M-n}$ which comprise those of the data samples $\{c^{M-n-1}_{l,k}\}$ of the decomposed data $y^{M-n-1}$ that have even vertical indexes k=2i and odd horizontal indexes l=2j+1.

The add/bit shifter 148 does so by producing each decomposed data sample $c^{M-n-1}_{2i,2j+1}$ of the LH component data $d^{M-n-1}$ according to:

$$c_{2i,2j+1}{}^{M-n-1} = S^1 c_{2i,2j+1}{}^{M-n} - (c_{2i,2j}{}^{M-n} + c_{2i,2j+2}{}^{M-n}) + S^{-1}(c_{2i-1,2j+1}{}^{M-n-1} + c_{2i+1,2j+1}{}^{M-n-1})$$  Equation 3

Here, the subset of input data samples $\{c^{M-n}_{2i,2j+1}\}$ of the input data $c^{M-n}$ are selected to correspond to the set of decomposed data samples $\{c^{M-n-1}_{2i,2j+1}\}$ of LH component data so that there is a corresponding data sample $c^{M-n}_{2i,2j+1}$ in the input data for each data sample $c^{M-n-1}_{2i,2j+1}$ of the LH component data. Furthermore, each decomposed data sample of the LH component data is the weighted sum of the corresponding input data sample in the input data, the data samples $c^{M-n}_{2i,2j}$ and $c^{M-n}_{2i,2j+2}$ that are horizontally adjacent to the corresponding input data sample in the input data, and the decomposed data samples $c^{M-n-1}_{2i-,2j+1}$ and $c^{M-n-1}_{2i+1,2j+1}$ that correspond to the input data samples $c^{M-n}_{2i+1}$ and $c^{M-n}_{2i+1,2j+1}$ that are vertically adjacent to the corresponding input data sample in the input data. The add/bit shifter 170 includes adders ($\Sigma$) and bit shifters ($S^1$ and $S^{-1}$) for computing this weighted sum by using only add (including) and bit shift arithmetic operations.

The decomposition filter 134-M–n includes a 1-D spatial shift module (1-D SS) 140. This spatial shift module spatially shifts the set of decomposed data samples $\{c^{M-n-1}_{2i+1,2j}\}$ of the HL component data $e^{M-n-1}$ up by one data sample in the vertical dimension to produce the spatially shifted set of decomposed data samples $\{c^{M-n}_{2i-1,2j}\}$. This is done with a vertical dimension spatial shifter ($z^1_i$). The decomposed data samples $\{c^{M-n-1}_{2i-1,2j}\}$ comprise those of the data samples of the decomposed data $y^{M-n-1}$ that have odd vertical indexes $k=2i-1$ and even horizontal indexes $l=2j$ such that each data sample $c^{M-n-1}_{2i-1,2j}$ is spatially adjacent to the data sample $c^{M-n-1}_{2i,2j}$ of the decomposed data by one data sample in the vertical dimension.

The decomposition filter 134-M-n includes still another 1-D spatial shift module (1-D SS) 142. This spatial shift module spatially shifts the set of decomposed data samples $\{c^{M-n-1}_{2i,2j+1}\}$ of the LH component data $d^{M-n-1}$ up by one data sample in the horizontal dimension to produce the spatially shifted set of decomposed data samples $\{c^{M-n}_{2i,2j-1}\}$. This is done with a horizontal dimension spatial shifter ($z^1_j$). The decomposed data samples $\{c^{M-n-1}_{2i,2j-1}\}$ comprise those of the data samples of the decomposed data $y^{M-n-1}$ that have even vertical indexes $k=2i$ and odd horizontal indexes $l=2j-1$ such that each data sample $c^{M-n-1}_{2i,2j-1}$ is spatially adjacent to the data sample $c^{M-n-1}_{2i,2j}$ of the decomposed data by one data sample in the horizontal dimension.

The subset of input data samples $\{c^{M-n}_{2i,2j}\}$ and the sets of decomposed data samples $\{c^{M-n-1}_{2i+1,2j+1}\}$, $\{c^{M-n-1}_{2i+1,2j}\}$, $c^{M-n-1}_{2i,2j+1}\}$, $c^{M-n-1}_{2i-1,2j+1}\}$, $\{c^{M-n-1}_{2i+1,2j-1}\}$, $c^{M-n-1}_{2i,2j-1}\}$, $\}$, $\}c^{M-n-1}_{2i-1,2j}\}$, and $\{c^{M-n-1}_{2i,2j-1}\}$ of the HH, HL, and LH component data $f^{M-n-1}$, $e^{M-n-1}$, and $d^{M-n-1}$ are processed in both the vertical and horizontal dimensions by the 2-D add/bit shifter (A/BS) 149. This produces the set of decomposed data samples $\{c^{M-n-1}_{2i,2j}\}$ of the LL component data $c^{M-n-1}$ of the input data $c^{M-n}$ which comprise those of the data samples ($c^{M-n-1}_{l,k}$) of the decomposed data $y^{M-n-1}$ that have even vertical and horizontal indexes $k=2i$ and $l=2j$.

The add/bit shifter 149 produces each decomposed data sample $c^{M-n-1}_{2i,2j}$ of the LL component data $c^{M-n-1}$ according to:

$$c_{2i,2j}^{M-n-1} = S^1 c_{2i,2j}^{M-n} + S^{-2}(c_{2i-1,2j}^{M-n-1} + c_{2i+1,2j}^{M-n-1} + c_{2j,2j-1}^{M-n-1} + c_{2j,2j+1}^{M-n-1})$$

$$-S^{-3}(c_{2i-1,2j-1}^{M-n-1} + c_{2i+1,2j-1}^{M-n-1} + c_{2i-1,2j+1}^{M-n-1} + c_{2i+1,2j+1}^{M-n-1}) \quad \text{Equation 4}$$

where $S^{-3}$ denotes shifting each bit three bits over so as to divide by 8. Here, the subset of input data samples $\{c^{M-n}_{2i,2j}\}$ of the input data $c^{M-n}$ is selected to correspond to the set of decomposed data samples $\{c^{M-n-1}_{2i,2j}\}$ of the LL component data so that there is a corresponding data sample $c^{M-n}_{2i,2j}$ in the input data for each data sample $c^{M-n-1}_{2i,2j}$ of the LL component data. And, each decomposed data sample of the LL component data is the weighted sum of the corresponding input data sample in the input data and the decomposed data samples $c^{M-n-1}_{2i-1,2j}$, $c^{M-n-1}_{2i,2j-1}$, $c^{M-n-1}_{2i-1,2j-1}$, $c^{M-n-1}_{2i+1,2j-1}$, $c^{M-n-1}_{2i-1,2j+1}$, $c^{M-n-1}_{2i+2,2j}$, and $c^{M-n-1}_{2i,2j+1}$ that correspond to the input data samples $c^{M-n}_{2i-1,2j}$, $c^{M-n}_{2i,2j-1}$, $c^{M-n}_{2i-1,2j-1}$, $c^{M-n}_{2i+1,2j-1}$, $c^{M-n}_{2i-1,2j+1}$, $c^{M-n}_{2i+1,2j+1}$, $c^{M-n}_{2i+1,2j}$, and $c^{M-n}_{2i,2j+1}$ that are vertically and/or horizontally adjacent to the corresponding input data sample in the input data. The add/bit shifter 178 includes adders ($\Sigma$) and bit shifters ($S^1$, $S^{-2}$, and $S^{-3}$) for computing this weighted sum by using only add (including) and bit shift arithmetic operations.

The embodiment of decomposition filter 134-M-n in FIG. 5 can be used both for performing wavelet-like transformations that are separable in the horizontal and vertical dimensions and for performing wavelet-like transformations that are not separable in this way. In other words, it can be used in wavelet-like transformations where the set of input data samples $\{c^{M-n}_{k,l}\}$ of input 2-D data $c^{M-n}$ are first processed in one spatial dimension and then the resulting data samples are precessed in the other spatial dimension. Or, it can be used in wavelet-like transformations which can only process the data samples of the input 2-D data simultaneously in both spatial dimensions.

Figure 8A:
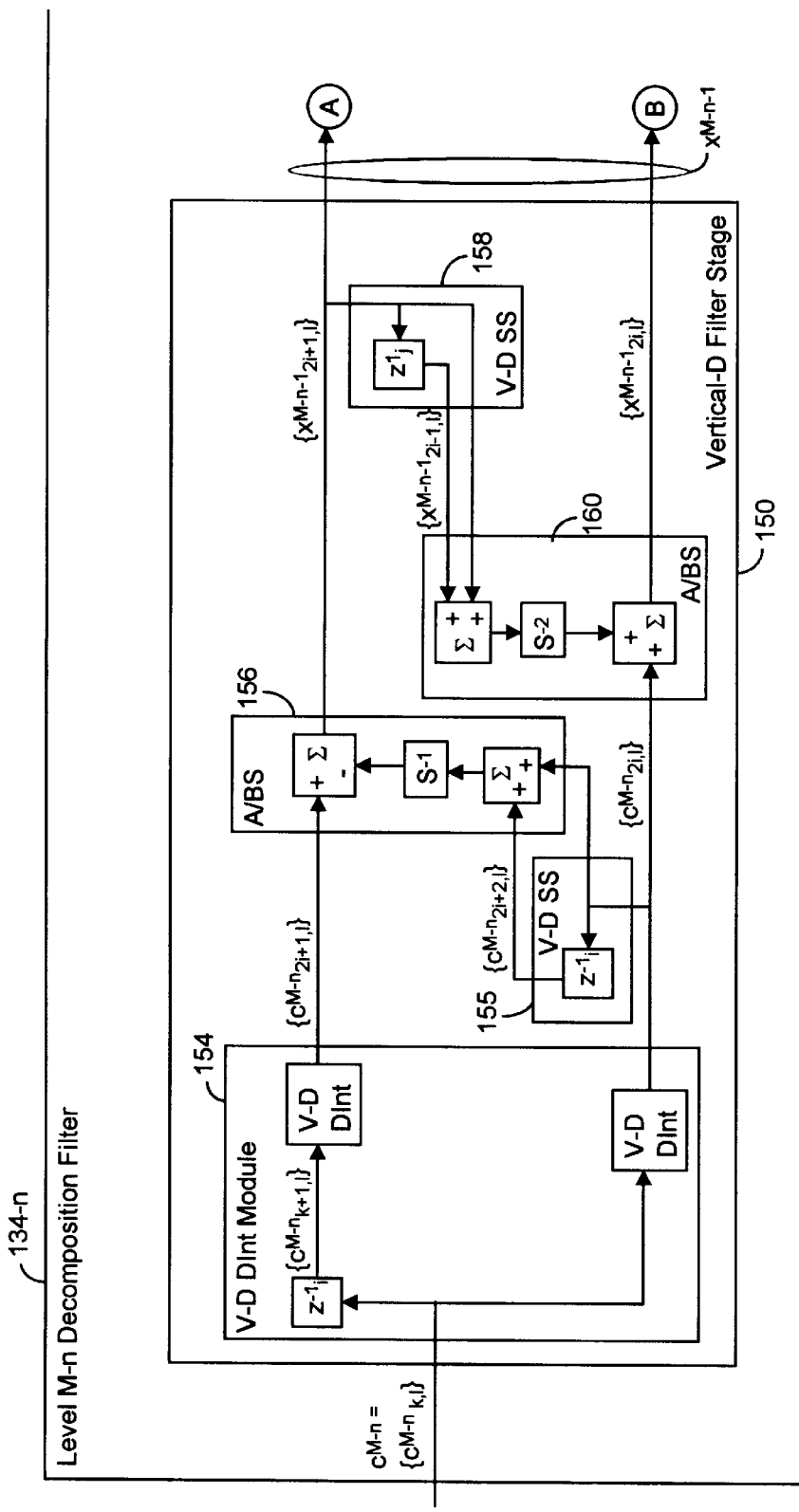
FIGS. 8a and 8b provide another embodiment of each decomposition filter of the wavelet-like transform generator of FIG. 4 for decomposing input 2-D data.
Figure 8B:
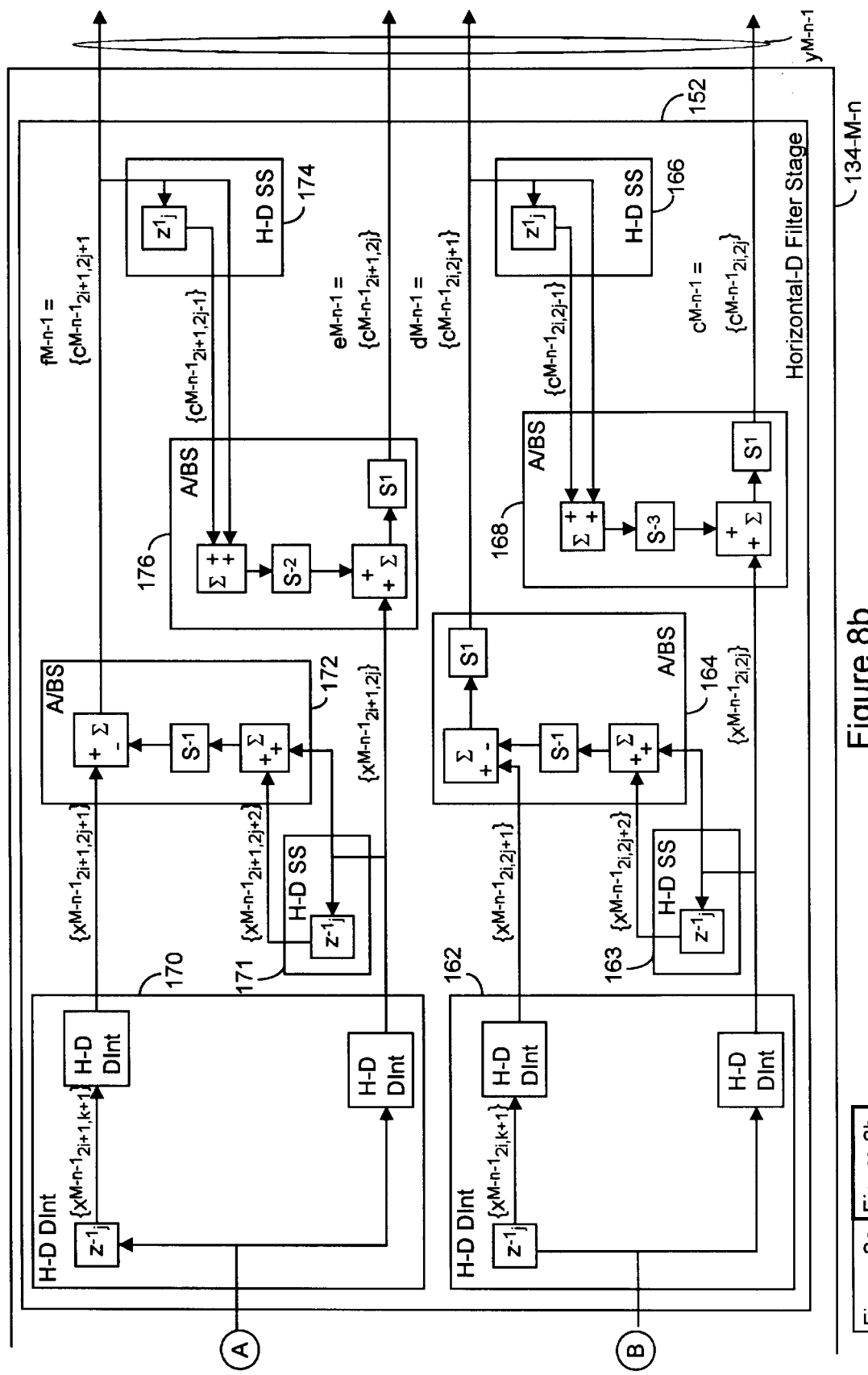

FIGS. 8a and 8b show an embodiment of the decomposition filter 134-M-n for each decomposition level n which is used for wavelet-like transformations that are dimensionally separable. Like with the embodiment of FIG. 5, FIGS. 8a and 8b show the conceptual configuration and effective operation of the decomposition filter and those skilled in the art will recognize that, in addition to this particular configuration, other configurations could be used to implement it.

As in the embodiment if FIG. 5, the corresponding input 2-D data $c^{M-n}$ comprises the set of data samples $\{c^{M-n}_{k,l}\}$ which are provided to the decomposition filter 134-M-n. In this embodiment, the decomposition filter includes a vertical dimension (vertical-D) filter stage 150 for processing the data samples of the input data in the vertical dimension to produce two sets of intermediate decomposed data samples $\{x^{M-n-1}_{2i+1,l}\}$ and $\{x^{M-n-1}_{2i,l}\}$ of intermediate decomposed input 2-D data $x^{M-n-1}$. The sets of intermediate decomposed data samples are then processed in the horizontal dimension by the horizontal dimension (horizontal-D) filter stage 152 of the decomposition filter to produce the sets of decomposed data samples $\{c^{M-n-1}_{2i,2j}\}$, $\{c^{M-n-1}_{2i,2j+1}\}$, $\{c^{M-n-1}_{2i+1,2j}\}$, and $\{c^{M-n-1}_{2i+1,2j+1}\}$ of the LL, LH, HL, and HH component 2-D data $c^{M-n-1}$, $d^{M-n-1}$, $e^{M-n-1}$ and $f^{M-n-1}$, respectively, that form the decomposed 2-D data $y^{M-n}$. As in the embodiment of FIG. 5, this is done in accordance with Equations 1–4.

Referring now to FIG. 8a, 9, and 10, the vertical-D filter stage 150 includes a vertical dimension deinterleaving module (V-D DInt Module) 154. The deinterleaving module deinterleaves the set of input data samples $\{c^{M-n}_{k,l}\}$ of the input data $c^{M-n}$ in the vertical dimension to produce the subsets of input data samples $\{c^{M-n}_{2i,l}\}$ and $\{c^{M-n}_{2i+1,l}\}$ of the set of input data samples $\{c^{M-n}_{k,l}\}$.

To do this, the vertical dimension deinterleaving module 154 includes a vertical dimension deinterleavers (V-D DInt). The deinterleavers deinterleaves the set of input data samples $\{c^{M-n}_{k,l}\}$ of the input data $c^{M-n}$ in the vertical dimension. This produces the subset of input data samples $\{c^{M-n}_{2i,l}\}$ which comprise those of the input data samples $\{c^{M-n}_{k,l}\}$ of the input data $c^{M-n}$ that hive even vertical indexes $k=2i$.

Additionally, the vertical dimension deinterleaving module 154 also includes a vertical dimension spatial shifter ($z^{-1}_k$) which spatially shifts the set of input data samples $\{c^{M-n}_{k,l}\}$ of the input data $c^{M-n}$ down by one data sample in the vertical dimension. This produces the spatially shifted set of input data samples $\{c^{M-n-1}_{k+1,l}\}$ which is deinterleaved by another vertical dimension deainterleaver (V-D DInt) of the deinterleaving module. This produces the subset of input data samples $\{c^{M-n}_{2i+1,l}\}$ which comprise those of the data samples $\{c^{M-n}_{k,l}\}$ of the input data $c^{M-n}$ that have odd vertical indexes $k=2i+1$ such that each data sample $c^{M-n}_{2i+1,l}$ is spatially adjacent to the data sample $c^{M-n}_{2i,l}$ in the input data by one data sample in the vertical dimension.

The vertical-D filter stage 150 includes a vertical dimension spatial shift module (V-D SS) 155. The spatial shift module spatially shifts the set of input data samples $\{c^{M-n}_{2i,l}\}$ of the input data $c^{M-n}$ down by one data sample in the vertical dimension to produce the spatially shifted subset of input data samples $\{c^{M-n}_{2i+2,l}\}$. To do this, it includes a vertical dimension spatial shifter ($z^{-1}_{2i}$). The input data samples $\{c^{M-n}_{2i+2,l}\}$ comprise those of the input data samples $\{c^{M-n}_{k,l}\}$ of the input data that have even vertical indexes k=2i+2 such that each data sample $c^{M-n-1}_{2i+2,l}$ is spatially adjacent to the data sample $c^{M-n}_{2i,l}$ in the input data by two data samples in the vertical dimension.

The vertical dimension add/bit shifter (A/BS) 156 of the vertical dimension filter stage 150 processes the subsets of input data samples $\{c^{M-n}_{2i+1,l}\}$, $\{c^{M-n}_{2i+2,l}\}$, and $c^{M-n}_{2i,l}$ in the vertical dimension. In response, it produces the set of intermediate decomposed data samples $\{x^{M-n}_{2i+1}\}$ of the intermediate decomposed data $x^{M-n-1}$ which comprise those of the intermediate decomposed data samples $\{x^{M-n-1}_{k,l}\}$ of the intermediate decomposed data that have odd vertical indexes k=2i+1. In doing so, the add/bit shifter produces each intermediate decomposed data sample $x^{M-n-1}_{2i+1,l}$ according to:

$$x_{2i+1,l}^{M-n-1} = c_{2i+1,l}^{M-n} - S^{-1}(c_{2i,l}^{M-n} + c_{2i+2,l}^{M-n})\qquad\text{Equation 5}$$

The subset of input data sample $\{c^{M-n}_{2i+1,l}\}$ is selected to correspond to the set of intermediate decomposed data samples $\{x^{M-n-1}_{2i+1,l}\}$ so that there is an input data sample $c^{M-n}_{2i+1,l}$ for each intermediate decomposed data sample $x^{M-n-1}_{2i+1,l}$. And, each intermediate decomposed data sample $x^{M-n-1}_{2i+1,l}$ is spatially adjacent to the data sample $x^{M-n-1}_{2i,l}$ in the intermediate decomposed data by one data sample in the vertical dimension. Furthermore, each intermediate decomposed data sample is the weighted sum of the corresponding input data sample $c^{M-n}_{2i+1,l}$ in the input data $c^{M-n}$ and the input data samples $c^{M-n}_{2i,l}$ and $c^{M-n}_{2i+2,l}$ that are vertically adjacent to the corresponding input data sample in the input data. The add/bit shifter includes adders ($\Sigma$) and a bit shifter ($S^{-1}$) that together compute this weighted sum using only add (including) and bit shift arithmetic operations.

In this embodiment, the vertical dimension filter stage 150 includes a vertical dimension spatial shift module (V-D SS) 158. The spatial shift module spatially shifts the set of intermediate decomposed data samples $\{x^{M-n-1}_{2i+1,l}\}$ of the intermediate decomposed data $x^{M-n-1}$ up by one data sample in the vertical dimension to produce the spatially shifted set of intermediate decomposed data samples $\{x^{M-n-1}_{2i-1,l}\}$. This is done with a vertical dimension spatial shifter ($z_{1i}$). The intermediate decomposed data samples $\{x^{M-n-1}_{2i-1,l}\}$ comprise those of the intermediate decomposed data samples $\{x^{M-n-1}_{k,l}\}$ of the intermediate decomposed data that have odd vertical indexes k=2i-1 such that each date sample $c^{M-n-1}_{2i-1,l}$ is spatially adjacent to the data sample $x^{M-n-1}_{2i,l}$ in the intermediate decomposed data by one data sample in the vertical dimension.

The vertical dimension add/bit shifter (A/BS) 160 of the vertical dimension filter stage 180 processes the subset of input data samples $\{c^{M-n}_{2i,l}\}$ and the sets of intermediate decomposed data samples $\{x^{M-n-1}_{2i+1,l}\}$ and $\{x^{M-n-1}_{2i-1,l}\}$ in the vertical dimension. In response, it produces the other set of intermediate decomposed data samples $\{x^{M-n-1}_{2i,l}\}$ of the intermediate decomposed data $x^{M-n-1}$ which comprise those of the intermediate decomposed data samples $\{x^{M-n-1}_{l,k}\}$ that have even vertical indexes k=2i. It does so by producing each intermediates decomposed data sample $x^{M-n-1}_{2i,l}$ according to:

$$x_{2i,l}^{M-n-1} = c_{2i,l}^{M-n} + S^{-2}(x_{2i+1,l}^{M-n-1} + x_{2i-1,l}^{M-n-1})\qquad\text{Equation 6}$$

The subset of input data samples $\{c^{M-n}_{2i,l}\}$ is selected to correspond to the set of intermediate decomposed date samples $\{x^{M-n-1}_{2i,l}\}$ so that there is an input data sample $c^{M-n}_{2i,l}$ for each intermediate decomposed data sample $x^{M-n-1}_{2i,l}$. Each intermediate decomposed data sample $x^{M-n-1}_{2i,l}$ is therefore the weighted sum of the corresponding input data sample $c^{M-n}_{2i,l}$ ion the input data $c^{M-n}$ and the intermediate decomposed data samples $x^{M-n-1}_{2i+1,l}$ and $x^{M-n-1}_{2i-1,l}$ that correspond to the input data samples $c^{M-n}_{2i+1,l}$ and $C^{M-n}_{2i-1,l}$ that are vertically adjacent to the corresponding input data sample in the input data. The add/bit shifter includes adders ($\Sigma$) and a bit shifter ($S^{-2}$) that together compute this weighted sum by using only add (including) and bit shift arithmetic operations.

Referring now to FIGS. 8b, 6, 7, 9, and 10, the horizontal filter stage 152 includes a horizontal dimension deinterleaving module (H-D DInt Module) 162. The deinterleaving module deinterleaves the set of intermediate decomposed data samples $\{x^{M-n-1}_{2i,l}\}$ of the intermediate decomposed data $x^{M-n-1}$ in the horizontal dimension to produce the subsets of intermediate decomposed data samples $\{x^{M-n-1}_{2i,2j+1}\}$ and $\{x^{M-n-1}_{2i,l}\}$ of the set of intermediate decomposed data samples $\{c^{M-n-1}_{2i,l}\}$.

For doing so, the horizontal dimension deinterleaving module 162 includes a horizontal dimension deinterleaver (H-D DInt). The deinterleaver deinterleaves the set of intermediate decomposed data samples $\{x^{M-n-1}_{2i,l}\}$ of the intermediate decomposed data $x^{M-n-1}$ in the horizontal dimension. This produces the subset of intermediate decomposed data samples $\{x^{M-n-1}_{2i,2j}\}$ which comprise those of the intermediate decomposed data samples $\{x^{M-n-1}_{k,l}\}$ of the intermediate decomposed date that have even vertical and horizontal indexes k=2i and l=2j.

The horizontal dimension deinterleaving module 162 includes a horizontal dimension spatial shifter ($z^{-1}_j$) which spatially shifts the set of intermediate decomposed data samples $\{x^{M-n-1}_{2i,l}\}$ of the intermediate decomposed data $x^{M-n-1}$ down by one data sample in the horizontal dimension. This produces the spatially shifted set of intermediate decomposed data samples $\{x^{M-n-1}_{2i,l+1}\}$ which is deinterleaved in the horizontal dimension by a horizontal dimension deinterleaver (H-D DInt) of the deinterleaving modules. This produces the subset of intermediate decomposed data samples $\{x^{M-n-1}_{2i,2j+1}\}$ which comprise those of the intermediate decomposed data samples $\{x^{M-n-1}_{k,l}\}$ of the inter mediate decomposed data that have even vertical indexes k=2i and odd horizontal indexes l=2j+1 such that each data sample $x^{M-n-1}_{2i,2j+1}$ is spatially adjacent to the data sample $x^{M-n-1}_{2i,2j}$ in the intermediate decomposed data by one data sample in the horizontal dimension.

The horizontal filter stage 152 also includes a horizontal dimension spatial shift module (H-D SS) 163. The spatial shift module spatially shifts the subset of intermediate decomposed data samples $\{x^{M-n-1}_{2i,2j}\}$ of the intermediate decomposed date $x^{M-n-1}$ down by one data sample in the horizontal dimension to produce the spatially shifted subset of intermediate decomposed data samples $\{x^{M-n-1}_{2i,2j+2}\}$. This is accomplished with the horizontal dimension spatial shifter ($z^{-1}_j$). The intermediate decomposed data samples $\{x^{M-n-1}_{2i,2j+2}\}$ comprise those of the intermediate decomposed data samples $\{x^{M-n-1}_{k,l}\}$ of the intermediate decomposed data that have even vertical and horizontal indexes k=2i and l=2j+2 such that each data sample $x^{M-n-1}_{2i,2j+2}$ is spatially adjacent to the data sample $x^{M-n-1}_{2i,2j}$ in the intermediate decomposed data by two data samples in the horizontal dimension.

The horizontal dimension add/bit shifter (A/BS) 164 of the horizontal dimension filter stage 152 processes the subsets of intermediate decomposed data samples $\{x^{M-n-1}_{2i,2j}\}$, $\{x^{M-n-1}_{2i,2j+2}\}$, and $\{x^{M-n-1}_{2i,2j+1}\}$ in the horizontal dimension. In doing so, it produces the earlier discussed set of decomposed data samples $\{c^{M-n-1}_{2i,2j+1}\}$ of the LH component date $d^{M-n-1}$ of the input data $c^{M-n}$. The add/bit shifter does so by producing each decomposed data sample $c^{M-n-1}_{2i,2j+1}$ according to:

$$c_{2i,2j+1}^{M-n-1} = S^1[x_{2i,2j+1}^{M-n-1} - S^{-1}(x_{2i,2j+2}^{M-n-1} + x_{2i,2j}^{M-n-1})] \quad \text{Equation 7}$$

where Equation 7 is equivalent to Equation 3 in view of Equation 6. In this case, each decomposed data sample $c^{M-n-1}_{2i,2j+1}$ in the LH component data is the weighted sum of the corresponding intermediate decomposed data sample $x^{M-n-1}_{2i,2j+1}$ in the intermediate decomposed data $x^{M-n-1}$ and the intermediate decomposed data samples $x^{M-n-1}_{2i,2j+2}$ and $x^{M-n-1}_{2i,2j}$ that are horizontally adjacent to the corresponding intermediate decomposed data sample in the intermediate decomposed data. The add/bit shifter includes adders ($\Sigma$) and bit shifters ($S^{-1}$ and $S^1$) that together compute this weighted sum by using only add (including) and bit shift arithmetic operations.

The horizontal dimension filter staged 152 includes another horizontal dimension spatial shift module (H-D SS) 166. The spatial shift module spatially shifts the set of decomposed data samples $\{c^{M-n-1}_{2i,2j+1}\}$ of the LH component data $d^{M-n-1}$ up by one data sample in the horizontal dimension to produce the spatially shifted set of decomposed data samples $\{c^{M-n-1}_{2i,2j-1}\}$. To do so, the spatial shift module includes a horizontal dimension spatial shifter ($z^1_j$).

The horizontal dimension add/bit shifter (A/BS) 168 of the horizontal dimension filter stage 152 processes the subset of intermediate decomposed data samples $\{x^{M-n-1}_{2i,2j}\}$ and the sets of decomposed data samples $\{c^{M-n-1}_{2i,2j+1}\}$ and $\{c^{M-n-1}_{2i,2j-1}\}$ of the LH component date $d^{M-n-1}$ of the input data $c^{M-n}$. In response, it produces the earlier discussed set of decomposed date samples $\{c^{M-n-1}_{2i,2j}\}$ of the LL component data $c^{M-n-1}$ of the input data $c^{M-n}$. The add/bit shifter does so by producing each decomposed data sample $c^{M-n-1}_{2i,2j}$ according to:

$$c_{2i,2j}^{M-n-1} = S^1[x_{2i,2j}^{M-n-1} + S^{-3}(c_{2i,2j+1}^{M-n-1} + c_{2i,2j-1}^{M-n-1})] \quad \text{Equation 8}$$

where Equation 8 is equivalent to Equation 4 in view of Equation 6. Here, each decomposed date sample $c^{M-n-1}_{2i,2j}$ in the LL component data is the weighted sum of the corresponding intermediate decomposed date sample $x^{M-n-1}_{2i,2j}$ in the intermediate decomposed data $x^{M-n-1}$ and the decomposed data samples $c^{M-n-1}_{2i,2j+1}$ and $c^{M-n-1}_{2i,2j-1}$ that correspond to the intermediate decomposed data samples $x^{M-n-1}_{2i,2j+1}$ and $x^{M-n-1}_{2i,2j-1}$ that are horizontally adjacent to the corresponding intermediate decomposed data sample in the intermediate decomposed data. The add/bit shifter includes adders ($\Sigma$) and bit shifters ($S^{-3}$ and $S^1$) that together compute this weighted sum by using only add (including) and bit shift arithmetic operations.

The horizontal filter stage 152 further includes a horizontal dimension deinterleaving module (H-D DInt Module) 170. The deinterleaving module deinterleaves the set of intermediate decomposed data samples $\{x^{M-n-1}_{2i+1,l}\}$ of the intermediate decomposed data $x^{M-n-1}$ in the horizontal dimension to produce the subsets of intermediate decomposed data samples $\{x^{M-n-1}_{2i+1,2j+1}\}$ and $\{x^{M-n-1}_{2i+1,2j}\}$ of the the set of intermediate decomposed data samples $\{x^{M-n-1}_{2i+1,l}\}$.

Specifically, the horizontal dimension deinterleaving module 170 includes a horizontal dimension deinterleaver (H-D DInt). The deinterleaver deinterleaves the set of intermediate data samples $\{x^{M-n-1}_{2i+1,l}\}$ of the intermediate decomposed data $x^{M-n-1}$ in the horizontal dimension. This produces the set of intermediate data samples $\{x^{M-n-1}_{2i+1,2j}\}$ which comprise those of the intermediate decomposed data samples $\{x^{M-n-1}_{k,l}\}$ off the intermediate decomposed data that have odd vertical indexes k=2i+1 and even horizontal indexes l=2j such that each data sample $x^{M-n-1}_{2i+1,2j}$ is spatially adjacent to the data sample $x^{M-n-1}_{2i,2j}$ in the intermediate decomposed data by one data sample in the vertical dimension.

The horizontal dimension deinterleaving module 170 includes a horizontal dimension spatial shifter ($z^{-1}_j$) which spatially shifts the set of intermediate data Samples $\{x^{M-n-1}_{2i+1,l}\}$ of the intermediate decomposed data $x^{M-n-1}$ down by one data sample in the horizontal dimension. This produces the spatially shifted set of intermediate data samples $\{x^{M-n-1}_{2i+1,l+1}\}$ which is deinterleaved in the horizontal dimension by a horizontal dimension deinterleaver (H-D DInt) of the deinterleaving module. This produces the subset of intermediate data samples $\{x^{M-n-1}_{2i+1,2j+1}\}$ which comprise those of the intermediate decomposed data samples $\{x^{M-n-1}_{k,l}\}$ Of the intermediate decomposed data that have odd vertical and horizontal indexes k=2i+1 and indexes l=2j+1 such that each date sample $x^{M-n-1}_{2i+1,2j+1}$ is spatially adjacent to the date sample $x^{M-n-1}_{2i,2j}$ in the intermediate decomposed data by one data sample in the vertical and horizontal dimensions.

The horizontal filter stage 152 further includes another horizontal dimension spatial shift module (H-D SS) 171. This spatial shift module spatially shifts the subset of intermediate decomposed data samples $\{x^{M-n-1}_{2i+1,2j}\}$ of the intermediate decomposed data $x^{M-n-1}$ down by one data sample in the horizontal dimension to produce the spatially shifted subset of intermediate decomposed data samples $\{x^{M-n-1}_{2i+1,2j+2}\}$ To do so, the spatial shift module includes a horizontal dimension spatial shifter ($z^{-1}_j$). The intermediate decomposed data samples $\{x^{-n-1}_{2i+1,2j+2}\}$ comprise those of the intermediate decomposed data samples $\{c^{M-n-1}_{k,l}\}$ of the intermediate decomposed data that have odd vertical indexes k=2i+1 and even horizontal indexes l=2i+2 such that each data sample $x^{M-n-1}_{2j+1,2j+2}$ is spatially adjacent to the data sample $x^{M-n-1}_{2i,2j}$ in the intermediate decomposed data by one data sample in the vertical dimension and two data samples in the horizontal dimension.

The horizontal dimension add/bit shifter (A/BS) 172 of the horizontal dimension filter stage 152 processes the subsets of intermediate decomposed data samples $\{x^{M-n-1}_{2i+1,2j}\}$, $\{x^{M-n-1}_{2i+1,2j+2}\}$, and $\{x^{M-n-1}_{2i+1,2j+1}\}$ in the horizontal dimension. In doing so, it produces the earlier discussed set of decomposed data samples $\{c^{M-n-1}_{2i+1,2j+1}\}$ of the HH component data $f^{M-n-1}$ of the input data $c^{M-n}$. The add/bit shifter does so by producing each decomposed data sample $c^{M-n-1}_{2i+1,2j+1}$ according to:

$$c_{2i+1,2j+1}^{M-n-1} = x_{2i+1,2j+1}^{M-n-1} - S^{-1}(x_{2i+1,2j+2}^{M-n-1} + x_{2i+1,2j}^{M-n-1}) \quad \text{Equation 9}$$

where Equation 9 is equivalent to Equation 1 in view of Equation 5. Thus, each decomposed data sample $c^{M-n-1}_{2i+1,2j+1}$ in the HH component data is the weighted sum of the corresponding intermediate decomposed data sample $x^{M-n-1}_{2i+1,2j+1}$ in the intermediate decomposed data $x^{M-n-1}$ and the decomposed data samples $x^{M-n-1}_{2i+1,2j+2}$ and $x^{M-n-1}_{2i+1,2j}$ that are horizontally adjacent to the corresponding intermediate decomposed data sample in the intermediate decomposed data. The add/bit shifter includes adders ($\Sigma$) and a bit shifter ($S^{-1}$) that together compute this weighted sum by using only add (including) and bit shift arithmetic operations.

The horizontal dimension filter stage 152 includes another horizontal dimension spatial shift module (H-D SS) 174. The spatial shift module spatially shifts the set of decomposed data samples $\{c^{M-n-1}_{2i+1,2j+1}\}$ of the HH component data $f^{M-n-1}$ up by one date sample in the horizontal dimension to produce the spatially shifted set of decomposed data samples $\{c^{M-n-1}_{2i+1,2j-1}\}$. To do so, the spatial shift module includes a horizontal dimension spatial shifter ($z^1_j$).

The horizontal dimension add/bit shifter (A/BS) 176 of the horizontal dimension filter stage 152 processes the subset of intermediate decomposed data samples $\{x^{M-n-1}_{2i+1,2j}\}$ and the sets of decomposed data samples $\{c^{M-n-1}_{2i+1,2j+1}\}$ and $\{c^{M-n-1}_{2i+1,2j-1}\}$ of the HH component data $f^{M-n-1}$ of the input data $c^{M-n}$. In response, it produces the earlier discussed set of decomposed data samples $\{c^{M-n-1}_{2i+1,2j}\}$ of the LH component data $e^{M-n-1}$ of the input data $c^{M-n}$. The add/bit shifter does so by producing each decomposed data sample $c^{M-n-1}_{2i+1,2j}$ according to:

$$c_{2i+1,2j}^{M-n-1} = S^1[x_{2i+1,2j}^{M-n-1} + S^{-2}(c_{2i+1,2j+1}^{M-n-1} + c_{2i+1,2j-1}^{M-n-1})] \quad \text{Equation 10}$$

where Equation 10 is equivalent to Equation 2 in view of Equation 5. Here, each decomposed data sample $c^{M-n-1}_{2i+1,2j}$ in the LH component data is the weighted sum of the corresponding intermediate decomposed data sample $x^{M-n-1}_{2i+1,2j}$ in the intermediate decomposed data $x^{M-n-1}$ and the decomposed data samples $c^{M-n-1}_{2i+1,2j+1}$ and $c^{M-n-1}_{2i+1,2j-1}$ that correspond to the intermediate decomposed data samples $x^{M-n}_{2i+1,2j+1}$ and $x^{M-n}_{2i+1,2j-1}$ that are horizontally adjacent to the corresponding intermediate decomposed data sample in the intermediate decomposed data. The add/bit shifter includes adders ($\Sigma$) and bit shifters ($S^{-2}$ and $S^1$) that together compute this weighted sum by using only add (including) and bit shift arithmetic operations.

Therefore, referring back to FIGS. 3 and 4, the wavelet-like transform generator 122 uses N decomposition filters 134-M to 133-M−N+1 of the type just described to decompose the original 2-D data $c^M$ using N decompositions over N resolution levels. The resulting HH, HL and LH component 2-D data $\{f^{M-1}, e^{M-1}, d^{M-1}, \ldots, f^{M-n}, e^{M-n}, d^{M-n}, f^{M-n-1}, e^{M-n-1}, d^{M-n-1}, \ldots f^{M-N}, e^{M-N}, d^{M-N}\}$ and LL component 2-D data $c^{M-N}$ of the original data comprise the complete decomposed 2-D data $z^{M-N}$.

2-D Inverse Wavelet-Like Transformation

Figure 11:
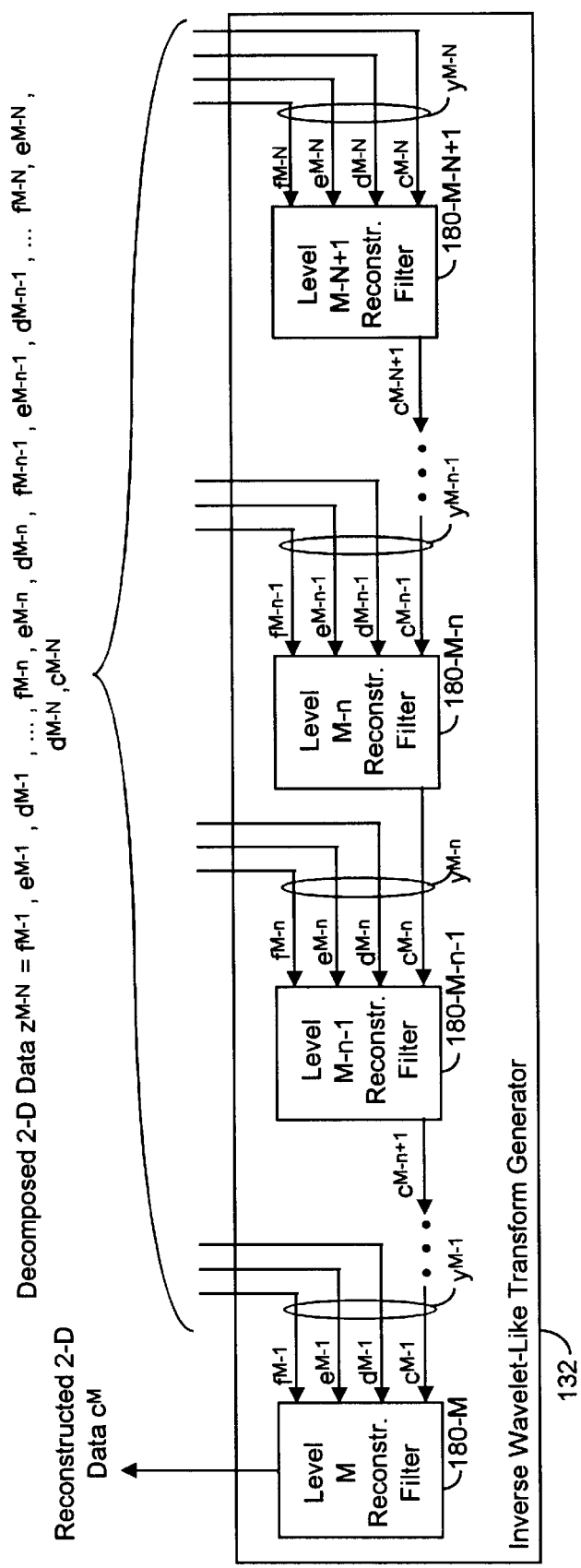
FIG. 11 is a block diagram of the inverse wavelet-like transform generator of the data processing system of FIG. 2.

Referring now to FIGS. 3 and 11, in the embodiment of FIG. 11, the inverse wavelet transform generator 132 may be used to reconstruct complete decomposed data $z^{M-N}$ of the type just described. In this case, the inverse wavelet transform generator uses an MRA 2-D inverse wavelet-like transform corresponding to the wavelet-like transform described earlier to reconstruct the original decomposed data over N resolution levels {M−n}, where n=N−1−r, and r=0 to N−1 and represents the Ruth reconstruction at the resolution level M−n. The inverse wavelet-like transform generator has a corresponding reconstruction filter 180-M−n for each resolution level M−n at which a reconstruction is made.

For each resolution level M−n at which a reconstruction is made, the corresponding level M−n reconstruction filter 180-M−n reconstructs decomposed 2-D data $y^{M-n-1}$ comprising LL, LH, HL, and HH component 2-D data $c^{M-n-1}$, $d^{M-n-1}$, $e^{M-n-1}$, and $f^{M-n-1}$ into reconstructed 2-D data $c^{M-n}$. This is done using the inverse wavelet-like transform just mentioned. For the first resolution level M−N+1 at which this is done, the LL, LH, HL, and HH component data $c^{M-N}$, $d^{M-N}$, $e^{M-N}$, and $f^{M-N}$ of the complete decomposed 2-D data $z^{M-N}$ comprise the decomposed data $y^{M-N}$ provided to the corresponding level M−N+1 reconstruction filter 180-M−N+1. However, for each subsequent resolution level M−n, the reconstructed data $c^{M-n}$ from the previous resolution level M−n−1 and the LH, HL, and HH component data $d^{M-n}$, $e^{M-n}$, and $f^{M-n}$ of the complete decomposed data comprise the decomposed data $y^{M-n}$ provided to the corresponding level M−n reconstruction filter 180-M−n. As a result, the complete reconstructed 2-D data $c^M$ is produced by the reconstruction filter 180-M for the last resolution level M at which a reconstruction is performed.

Figure 12:
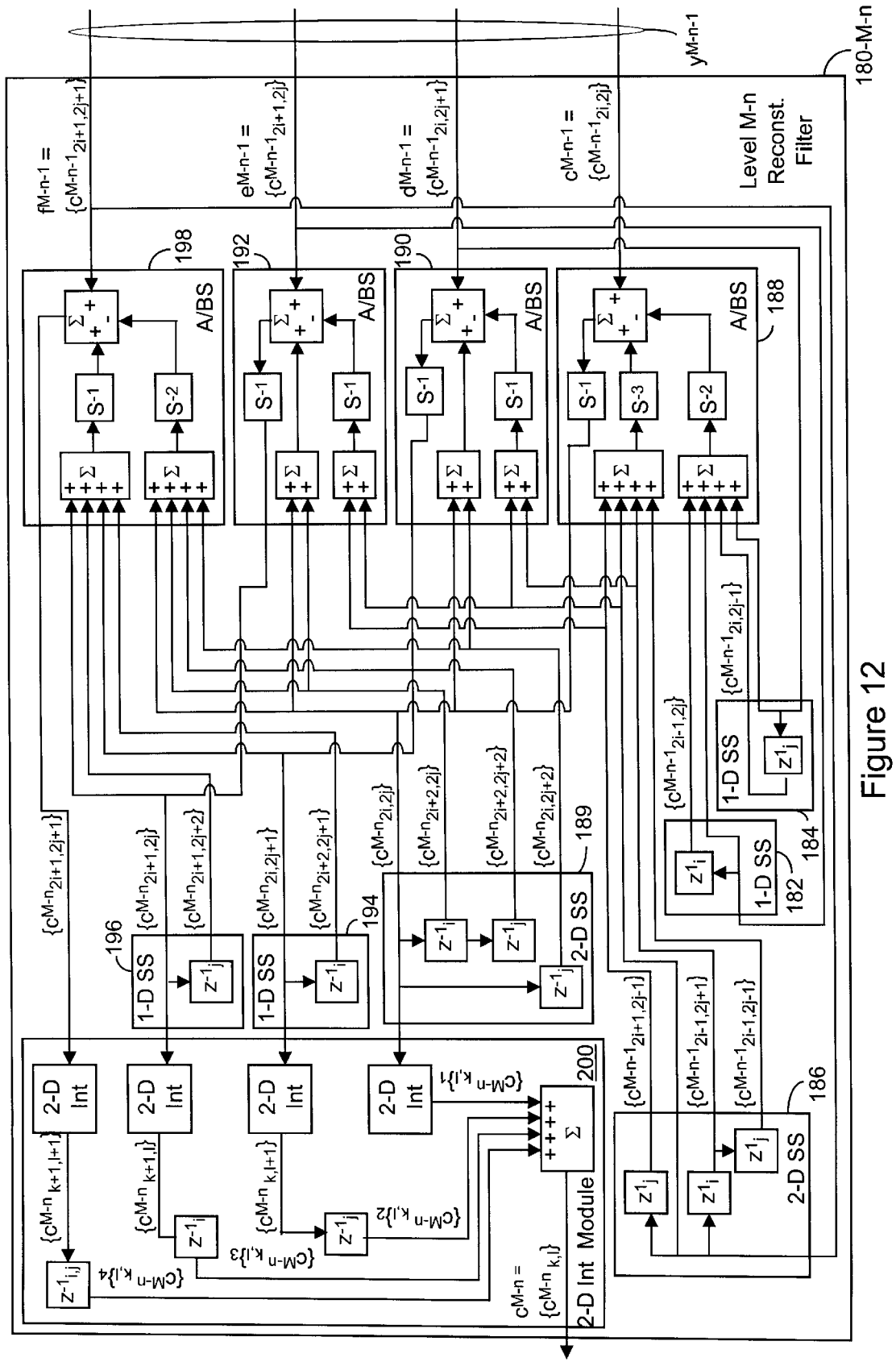
FIG. 12 provides one embodiment of each reconstruction filter of the inverse wavelet-like transform generator of FIG. 11.

FIG. 12 shows an embodiment of the reconstruction filter 180-M−n for each reconstruction level M−n which corresponds to the embodiment of the decomposition filter 134-M−n of FIG. 5. The reconstruction filter 180-M−n of FIG. 12 performs the reverse operation of that described earlier for the decomposition filter 134-M−n of FIG. 5. Thus, this embodiment of the reconstruction filter can be used to perform inverse wavelet transformations that correspond to wavelet-like transformations that are dimensionally separable or to perform inverse wavelet-like transformations that correspond to wavelet-like transformations that are not dimensionally separable.

Referring to FIGS. 12, 6, and 7, the reconstruction filter 180-M−n includes 1-D spatial shift modules (1-D SS) 182 and 184 and a 2-D spatial shift module (2-D SS) 186. The spatial shift module 182 spatially shifts the set of decomposed data samples $\{c^{M-n-1}_{2i+1,2j}\}$ of the HL component data $e^{M-n-1}$ of the decomposed data $y^{M-n-1}$ up by one date sample in the vertical dimension to produce the spatially shifted set of decomposed data samples $\{c^{M-n}_{2i-1,2j}\}$. Similarly, the spatial shift module 184 spatially shifts the set of decomposed data samples $\{c^{M-n-1}_{2i,2j+1}\}$ of the LH component data $d^{M-n-1}$ in the decomposed data up by one data sample in the horizontal dimension to produce the spatially shifted set of decomposed data samples $\{c^{M-n}_{2i,2j-1}\}$. And finally, the spatially shift module 186 spatially shifts the set of decomposed date samples $\{c^{M-n-1}_{2i+1,2j+1}\}$ of the HH component data $f^{M-n-1}$ in the decomposed data up by one data sample in the vertical dimension, the horizontal dimension, and both the vertical and horizontal dimensions to produce the spatially shifted sets of decomposed data samples $\{c^{M-n}_{2i-1,2j+1}\}$, $\{c^{M-n}_{2i+1,2j-1}\}$, and $\{c^{M-n}_{2i-1,2j-1}\}$. These spatial shift modules are configured and produce these sets of data samples in the same way as do the corresponding spatial shift modules 140, 142, and 138 of the decomposition filter 134-M−n of FIG. 5.

The sets of decomposed data samples ($c^{M-n-1}_{2i+1,2j+1}$), $\{c^{M-n-1}_{2i+1,2j}\}$, $\{c^{M-n-1}_{2i,2j+1}\}$, $\{c^{M-n-1}_{2i-1,2j+1}\}$, $\{c^{M-n-1}_{2i+1,2j-1}\}$, $\{c^{M-n-1}_{2i-1,2j-1}\}$, $\{c^{M-n-1}_{2i-1,2j}\}$, $\{c^{M-n-1}_{2i,2j-1}\}$, and $\{c^{M-n-1}_{2i,2j}\}$ of the HH HL, LH, and LL component data $f^{M-n-1}$, $e^{M-n-1}$, $d^{M-n-1}$, $c^{M-n-1}$ of the decomposed data $y^{M-n-1}$ are processed in both the vertical and horizontal dimensions by the 2-D add/bit shifter (A/BS) 188. This produces the subset of reconstructed data samples $\{c^{M-n}_{2i,2j}\}$ of the reconstructed data $c^{M-n}$ in accordance with Equation 4 (when it is rearranged to solve for the data sample $c^{M-n}_{2i,2j}$). This is the reverse operation to that performed by the corresponding 2-D add/bit shifter (A/BS) 149 of the decomposition filter 134-M−n of FIG. 5. Therefore, each reconstructed data sample $c^{M-n}_{2i,2j}$ is the weighted sum of the corresponding decomposed data sample $c^{M-n-1}_{2i,2j}$ in the decomposed data and the decomposed date samples $c^{M-n-1}_{2i+1,2j+1}$, $c^{M-n-1}_{2i+1,2j+1}$, $c^{M-n-1}_{2i+1,2j}$, $c^{M-n-1}_{2i,2j+1}$, $c^{M-n-1}_{2i-1,2j+1}$, $c^{M-n-1}_{2i-1,2j+1}$, $c^{M-n-1}_{2i+1,2j-1}$, $c^{M-n-1}_{2i-1,2j-1}$, $c^{M-n-1}_{2i-1,2j}$, $c^{M-n-1}_{2i,2j-1}$, and $c^{M-n-1}_{2i,2j}$ that correspond to the reconstructed data samples $c^{M-n}_{2i+1,2j+1}$, $c^{M-n}_{2i+1,2j}$, $c^{M-n}_{2i,2j+1}$, $c^{M-n}_{2i-1,2j+1}$, $c^{M-n}_{2i-1,2j+1}$, $c^{M-n}_{2i+1,2j-1}$, $c^{M-n}_{2i-1,2j-1}$, $c^{M-n}_{2i-1,2j}$, $c^{M-n}_{2i,2j-1}$, and $c^{M-n}_{2i,2j}$ that are vertically and/or horizontally adjacent to the reconstructed data sample in the reconstructed data. The add/bit shifter 178 includes adders ($\Sigma$) and bit shifters ($S^{-1}$, $S^{-2}$, and $S^{-3}$) for computing this weighted sum by using only add (including) and bit shift arithmetic operators.

The reconstruction filter 180-M-n also includes a 2-D spatial shift module (2-D SS) 189. The spatial shift module spatially shifts the subset of reconstructed data samples $\{c^{M-n-1}_{2i,2j}\}$ of the reconstructed data $c^{M-n}$ by one data sample in the vertical dimension, the horizontal dimension, and both the vertical and horizontal dimension to produce the spatially shifted subsets of reconstructed data samples $\{c^{M-n}_{2i+2,2j}\}$, $\{c^{M-n}_{2i,2j+2}\}$, and $\{(c^{M-n}_{2i+2,2j+2}\}$. The spatial shift module is configured and produces these sets of data samples in the same way as does the corresponding spatial shift module 137 of the decomposition filter 134-M-n of FIG. 5.

The subsets of reconstructed data samples $\{c^{M-n}_{2i,2j}\}$ and $\{c^{M-n}_{2i,2j+2}\}$ of the reconstructed date $C^{M-n}$ and the sets of decomposed data samples $\{c^{M-n-1}_{2i+1,2j+1}\}$, $\{c^{M-n-1}_{2i-1,2j+1}\}$ and $\{c^{M-n-1}_{2i,2j+1}\}$ of the HH and LH component data $f^{M-n-1}$ and $d^{M-n-1}$ of the decomposed data $y^{M-n-1}$ are processed in both the vertical and horizontal dimensions by the 2-D add/bit shifter 190 of the decomposition filter 180-M-n. This produces the subset of reconstructed date samples $\{c^{M-n}_{2i,2j+1}\}$ of the reconstructed data and is done in accordance with Equation 3 (when it is rearranged to solve for the data sample $c^{M-n}_{2i,2j+1}$). This is the reverse operation to that performed by the corresponding 2-D add/bit shifter (A/BS) 148 of the decomposition filter 134-M-n of FIG. 5. As a result, each reconstructed data sample $c^{M-n}_{2i,2j+1}$ is the weighted sum of the corresponding decomposed data sample $c^{M-n-1}_{2i,2j+1}$ in the LH component data $d^{M-n-1}$, the reconstructed data samples $c^{M-n}_{2i,2j}$ and $c^{M-n}_{2i,2j+2}$ that are horizontally adjacent to the reconstructed data sample in the reconstructed data, and the decomposed data samples $c^{M-n-1}_{2i-1,2j+1}$ and $c^{M-n-1}_{2i+1,2j+1}$ that correspond to the reconstructed data samples $c^{M-n}_{2i-1,2j+1}$ and $c^{M-n}_{2i+1,2j+1}$ that are vertically adjacent to the reconstructed data sample in the reconstructed data. The add/bit shifter 190 includes adders ($\Sigma$) and bit shifters ($S^{-1}$) for computing this weighted sum by using only add (including) and bit shift arithmetic operations.

Furthermore, the subsets of reconstructed data samples $\{c^{M-n}_{2i,2j}\}$ and $\{c^{M-n}_{2i+2,2j}\}$ of the reconstructed data $c^{M-n}$ and the sets of decomposed data samples $\{c^{M-n-1}_{2i+1,2j+1}\}$, $\{c^{M-n-1}_{2i+1,2j-1}\}$, and $\{c^{M-n-1}_{2i+1,2j}\}$ of the HH and HL component data $f^{M-n-1}$ and $e^{M-n-1}$ of the decomposed data $y^{M-n-1}$ are processed in both the vertical and horizontal dimensions by the 2-D add/bit shifter 192 of the reconstruction filter 180-M-n. This produces the subset of reconstructed data samples $\{c^{M-n}_{2i+1,2j}\}$ of the reconstructed data and is done in accordance with Equation 2 (when it is rearranged to solve for the data sample $c^{M-n}_{2i+1,2j}$). This is the reverse operation to that performed by the corresponding 2-D add/bit shifter (A/BS) 147 of the decomposition filter 134-M-n of FIG. 5. As a result, each reconstructed data sample $c^{M-n}_{2i+1,2j}$ is the weighted sum of the corresponding decomposed data sample $c^{M-n-1}_{2i+1,2j}$ in the HL component data $e^{M-n-1}$, the reconstructed data samples $c^{M-n}_{2i,2j}$ and $c^{M-n}_{2i+2,2j}$ that are horizontally adjacent to the reconstructed data sample in the reconstructed data, and the decomposed data samples $c^{M-n-1}_{2i+1,2j+1}$ and $c^{M-n-1}_{2i+1,2j+1}$ that correspond to the reconstructed data samples $c^{M-n}_{2i+1,2j-1}$ and $c^{M-n}_{2i+1,2j+1}$ that are vertically adjacent to the reconstructed data sample in the reconstructed data. The add/bit shifter 192 includes adders ($\Sigma$) and bit shifters ($S^{-1}$) for computing this weighted sum by using only add (including) and bit shift arithmetic operations.

Additionally, the reconstruction filter 80-M-n includes 1-D spatial shift modules (1-D SS) 194 and 196. The spatial shift module 196 spatially shifts the set of reconstructed data samples $\{c^{M-n}_{2i+1,2j}\}$ of the reconstructed data $c^{M-n}$ down by one data sample in the horizontal dimension to produce the spatially shifted subset of reconstructed data samples $\{c^{M-n}_{2i+1,2j+2}\}$. Similarly, the spatial shift module 194 spatially shifts the set of reconstructed data samples $\{c^{M-n}_{2i,2j+1}\}$ of the reconstructed data down by one data sample in the vertical dimension to produce the spatially shifted subset of reconstructed data samples $\{c^{M-n}_{2i+2,2j+1}\}$. These spatial shift modules are configured and produce these sets of data samples in the same way as do the corresponding spatial shift modules 141 and 139 of the decomposition filter 134-M-n of FIG. 5.

The subsets of reconstructed input data samples $\{c^{M-n}_{2i,2j}\}$, $\{c^{M-n}_{2i,2j+1}\}$, $\{c^{M-n}_{2i+1,2j}\}$, $\{c^{M-n}_{2i+2,2j+2}\}$, $\{c^{M-n}_{2i+2,2j}\}$, $\{c^{M-n}_{2i,2j+2}\}$, $\{c^{M-n}_{2i+1,2j+2}\}$, and $\{c^{M-n}_{2i+2,2j+1}\}$ and the set of decomposed data samples $\{c^{M-n}_{2i+1,2j+1}\}$ of the HH component data $f^{M-n-1}$ of the decomposed data $y^{M-n-1}$ are processed in both the vertical and horizontal dimensions by the 2D add/bit shifter (A/BS) 198. This produces the subset of reconstructed data samples $\{c^{M-n}_{2i+1,2j+1}\}$ of the input data $c^{M-n}$ is done in accordance with Equation 1 (when it is rearranged to solve for the data sample $c^{M-n}_{2i+1,2j+1}$) and is the reverse operation to that performed by the corresponding 2D add/bit shifter (A/BS) 146 of the decomposition filter 134-M-n of FIG. 5. As a result, each reconstructed data sample $c^{M-n}_{2i+1,2j+1}$ is the weighted sum of the corresponding data sample in the decomposed data and the reconstructed data samples $c^{M-n}_{2i,2j}$, $c^{M-n}_{2i,2j+1}$, $c^{M-n}_{2i+1,2j}$, $c^{M-n}_{2i+2,2j+2}$, $c^{M-n}_{2i+2,2j}$, $c^{M-n}_{2i,2j+2}$, $c^{M-n}_{2i+1,2j+2}$, and $c^{M-n}_{2i+2,2j+1}$ that are vertically and/or horizontally adjacent to the reconstructed data sample in the reconstructed data. The add/bit shifter includes adders ($\Sigma$) and bit shifters ($S^{-1}$ and $S^{-2}$) that together compute this weighted sum by using only add (including) and bit shift arithmetic operations.

The reconstruction filter 180-M-n also includes a 2-D interleaving (i.e., upsampling, demultiplexing, or switching) module (2-D Int Module) 200. The interleaving module interleaves (i.e., upsamples, demultiplexes, or switches) the subsets of reconstructed data samples $\{c^{M-n}_{2i,2j}\}$, $\{c^{M-n}_{2i,2j+1}\}$, $\{c^{M-n}_{2i+1,2j}\}$, and $\{c^{M-n}_{2i+1,2j+1}\}$ of the reconstructed data $c^{M-n}$ in the vertical and horizontal dimensions to produce the single set of reconstructed data samples $\{^{M-n}_{k,l}\}$ of the input data $c^{M-n}$. In other words, it performs the reverse operation to that performed by the corresponding 2-D deinterleaving module 136 of the decomposition filter 134-M-n of FIG. 5.

The 2-D interleaving module 200 includes 2-D interleavers (2-D Int) to respectively interleave the subsets of reconstructed data samples $\{c^{M-n}_{2i,2j}\}$, $\{c^{M-n}_{2i+1,2j}\}$, $\{c^{M-n}_{2i,2j+1}\}$, and $\{c^{M-n}_{2i+1,2j+1}\}$ of the reconstructed data $c^{M-n}$ in both the vertical and horizontal dimensions with zero valued data samples. This produces the subsets of reconstructed data samples $\{c^{M-n}_{k,l}\}_1$, $\{c^{M-n}_{k+1,l}\}$, $\{^{M-n}_{k,l+1}\}$, and $\{c^{M-n}_{k+1,l+1}\}$.

The 2-D interleaving module 200 further includes vertical and horizontal dimension spatial shifters ($z^1$, and $z^1_j$) that respectively spatially shift the subsets of reconstructed data samples $\{c^{M-n}_{k+1,l}\}$ and $\{c^{M-n}_{k+1,l}\}$ of the input data $c^{M-n}$ up by one data sample in the vertical and horizontal dimensions. This produces the spatially shifted subsets of reconstructed data samples $\{c^{M-n}_{k,l}\}_2$ and $\{c^{M-n}_{k,l}\}_3$. And, the interleaving module also includes a vertical and horizontal dimension spatial shifter ($z^1_{i,j}$) that spatially shifts the subset of reconstructed data samples $\{c^{M-n}_{k+1,l+1}\}$ of the input data up by one data sample in both the vertical and horizontal dimensions. This produces the spatially shifted subset of input data samples $\{c^{M-n}_{k,l}\}_4$.

As a result, in the first subset of reconstructed data samples $\{c^{M-n}_{k,l}\}_1$, the data samples that have even vertical and horizontal indexes k=2i and l=2j comprise the reconstructed data samples $\{c^{M-n}_{2i,2j}\}$ while all the other data samples have zero values. And, in the second subset of reconstructed data samples $\{c^{M-n}_{k,l}\}_2$, the data samples that have even vertical indexes k=2i and odd horizontal indexes l=2j+1 comprise the reconstructed data samples $\{c^{M-n}_{2i,2j+1}\}$ while all the other data samples have zero values. Similarly, in the second subset of reconstructed data samples $\{c^{M-n}_{k,l}\}_3$, the data samples that have odd vertical indexes k=2i+1 and even horizontal indexes l=2j comprise the reconstructed data samples $\{c^{M-n}_{2i+1,2j}\}$ while all the other data samples have zero values. Finally, in the fourth subset of reconstructed data samples $\{c^{M-n}_{k,l}\}_4$, the data samples that have odd vertical and horizontal indexes k=2i+1 and l=2j+1 comprise the reconstructed data samples $\{c^{M-n}_{2i+1,2j+1}\}$ while all the other data samples have zero values.

Lastly, the 2-D interleaving module 200 includes an adder ($\Sigma$) that adds the subsets of reconstructed data samples $\{c^{M-n}_{k,l}\}_1$, $\{c^{M-n}_{k,l}\}_2$, $\{c^{M-n}_{k,l}\}_3$, and $\{c^{M-n}_{k,l}\}_4$, together. This produces the complete set of reconstructed data samples $\{c^{M-n}_{k,l}\}$ of the reconstructed data $c^{M-n}$.

Figure 13A:
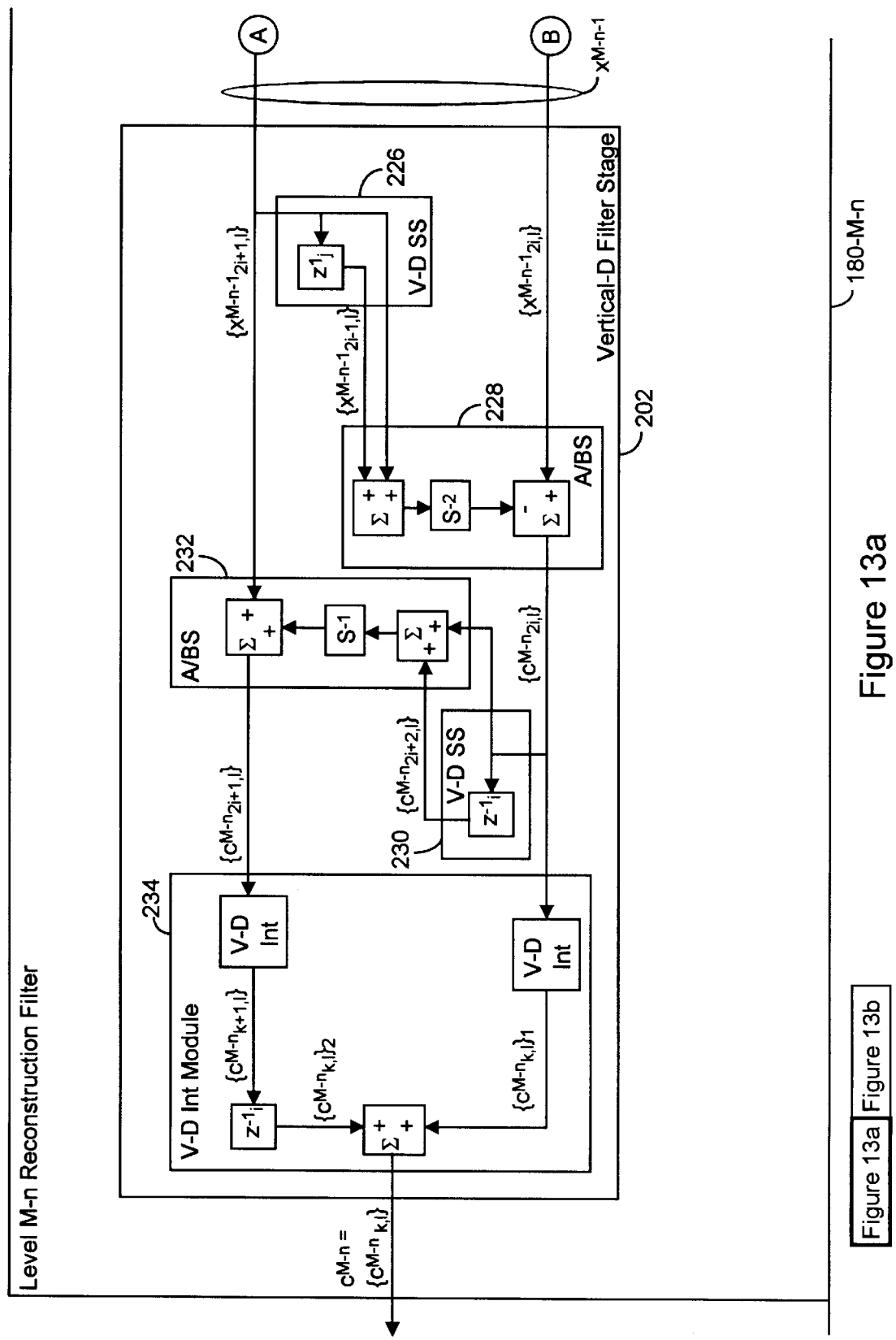
FIGS. 13a and 13b provide another embodiment of each reconstruction filter of the wavelet-like transform generator of FIG. 11.
Figure 13B:
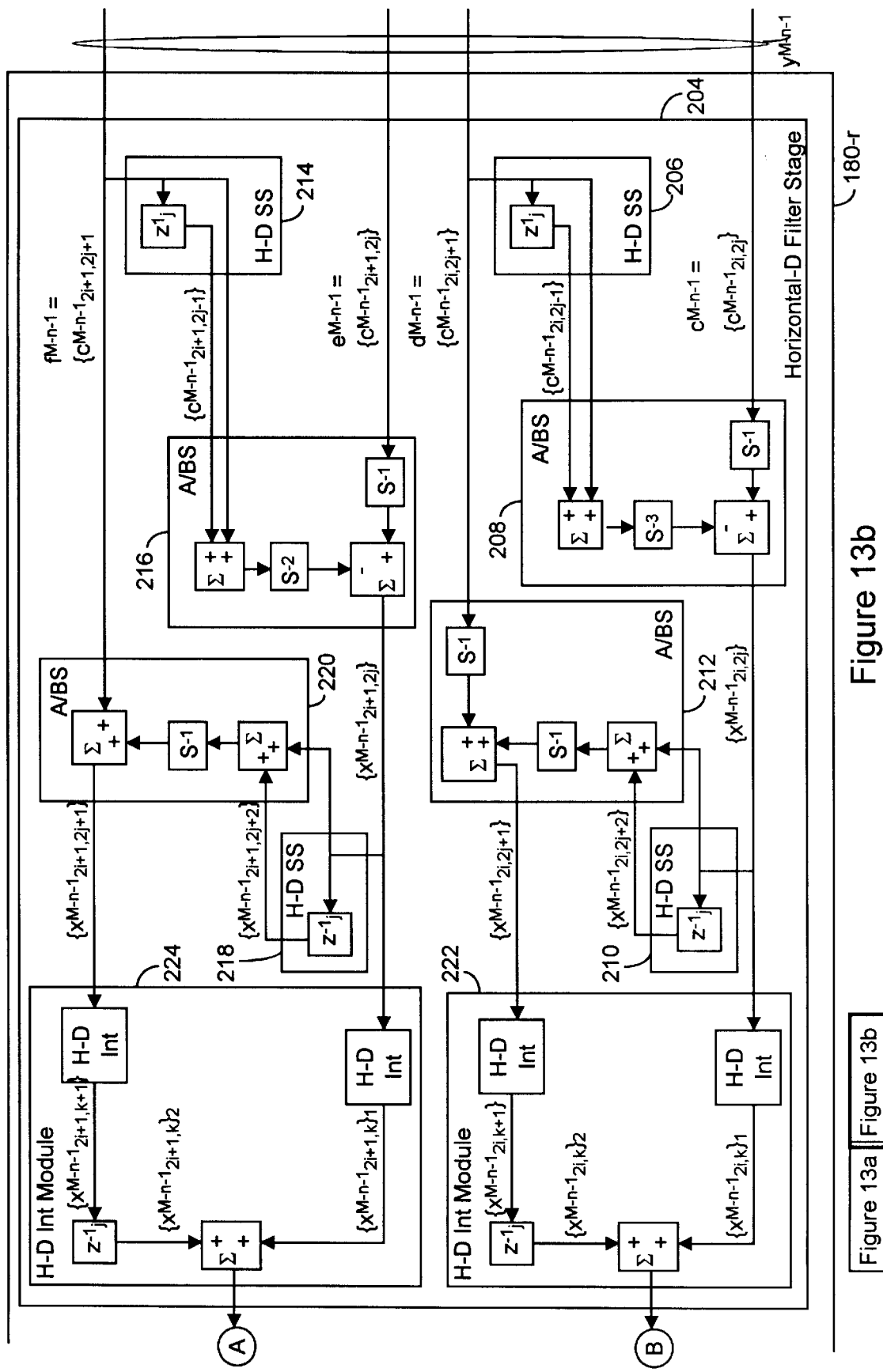

Furthermore, FIGS. 13a and 13b show an embodiment of the reconstruction filter 180-M-n for each resolution level M-n which performs the reverse operation of that described earlier for the decomposition filter 134-M-n of FIGS. 8a and 8b. Thus, this embodiment of the reconstruction filter has vertical and horizontal dimension filter stages 202 and 204 and is used for inverse wavelet-like transformations that are dimensionally separable. Like with the embodiment of FIG. 12, FIGS. 13a and 13b show the conceptual configuration and effective operation of the reconstruction filter and those skilled in the art will recognize that, in addition to this particular configuration, other configurations could be used to implement it.

Referring to FIGS. 13b, 7, 9, and 10, in this embodiment of reconstruction filter 180-M-n, the horizontal dimension filter stage 204 includes a horizontal dimension spatial shift module (H-D SS) 206. The spatial shift module spatially shifts the set of decomposed data samples $\{c^{M-n-1}_{2i,2j+1}\}$ of the LH component data $d^{M-n-1}$ of the decomposed data $y^{M-n-1}$ up by one data sample in the horizontal dimension to produce the spatially shifted set of decomposed data samples $\{c^{M-n}_{2i,2j-1}\}$. This spatial shift module is configured and produces this set of data samples in the same way as does the corresponding spatial shift module 166 of the decomposition filter 134-M-n of FIG. 8b.

The horizontal dimension add/bit shifter (A/BS) 208 of the horizontal dimension filter stage 204 processes the sets of decomposed data samples $\{c^{M-n-1}_{2i,2j}\}$, $\{c^{M-n-1}_{2i,2j+1}\}$, and $\{c^{M-n-1}_{2i,2j-1}\}$ of the LL and LH component data $c^{M-n-1}$ and $d^{M-n-1}$ of the decomposed data $y^{M-n-1}$. In response, it produces the subset of intermediate reconstructed data samples $\{x^{M-n-1}_{2i,2j}\}$ of the intermediate reconstructed data $x^{M-n-1}$. This is done in accordance with Equation 8 (when it is rearranged to solve for the data sample $x^{M-n-1}_{2i,2j}$) and is the reverse operation to that performed by the corresponding horizontal dimension add/bit shifter (A/BS) 168 of the decomposition filter 134-M-n of FIG. 8b. Thus, each intermediate reconstructed data sample $x^{M-n-1}_{2i,2j}$ is the weighted sum of the corresponding decomposed data sample $c^{M-n-1}_{2i,2j}$ in the decomposed data and the decomposed data samples $c^{M-n-1}_{2i,2j-1}$ and $c^{M-n-1}_{2i,2j+1}$ that correspond to the intermediate reconstructed data samples $x^{M-n-1}_{2i,2j-1}$ and $x^{M-n-1}_{2i,2j+1}$ that are horizontally adjacent to the intermediate reconstructed data sample in the intermediate reconstructed data. The add/bit shifter includes adders ($\Sigma$) and bit shifters ($S^{-3}$ and $S^{-1}$) that together compute this weighted sum by using only add (including) and bit shift arithmetic operations.

The horizontal dimension filter stage 204 includes a horizontal dimension spatial shift module (H-D SS) 210. The spatial shift module spatially shifts the subset of intermediate reconstructed date samples $\{x^{M-n-1}_{2i,2j}\}$ of the intermediate reconstructed data $x^{M-n-1}$ down by one data sample in the horizontal dimension to produce the spatially shifted subset of intermediate reconstructed data samples $\{x^{M-n-1}_{2i,2j+2}\}$. This spatial shift module is configured and produces this set of data samples in the same way as does the corresponding spatial shift module 162 of the decomposition filter 134-M-n of FIG. 12.

The horizontal dimension add/bit shifter (A/BS) 212 of the horizontal dimension filter stage 204 processes the subsets of intermediate reconstructed data samples $\{x^{M-n-1}_{2i,2j}\}$ and $\{x^{M-n-1}_{2i,2j+2}\}$ of the intermediate reconstructed data $x^{M-n-1}$ and the set of decomposed data samples $\{c^{M-n-1}_{2i,2j+1}\}$ of the LH component data $d^{M-n-1}$ of the decomposed data $y^{M-n-1}$. In response, it produces the subset of intermediate reconstructed data samples $\{x^{M-n-1}_{2i,2j+1}\}$ of the intermediate reconstructed data $x^{M-n-1}$. This is done in accordance with Equation 7 (when it is rearranged to solve for the data sample $x^{M-n-1}_{2i,2j+1}$) and is the reverse operation to that performed by the corresponding horizontal dimension add/bit shifter (A/BS) 164 of the decomposition filter 134-M-n of FIG. 8b. Thus, each intermediate reconstructed data sample $c^{M-n-1}_{2i,2j+1}$ is the weighted sum of the corresponding decomposed data sample $c^{M-n-1}_{2i,2j+1}$ in the decomposed data and the intermediate reconstructed data samples $x^{M-n-1}_{2i,2j+2}$ and $x^{M-n-1}_{2i,2j}$ that are horizontally adjacent to the intermediate reconstructed data sample in the intermediate reconstructed data. The add/bit shifter includes adders ($\Sigma$) and bit shifters ($S^{-1}$) that together compute this weighted sum by using only add (including) and bit shift arithmetic operations.

The horizontal dimension filter stages 204 further includes a horizontal dimension spatial shift module (H-D SS) 214. The spatial shift module spatially shifts the set of decomposed data samples $\{c^{M-n-1}_{2i+1,2j+1}\}$ of the HH component data $f^{M-n-1}$ of the decomposed data $y^{M-n-1}$ up by one data sample in the horizontal dimension to produce the spatially shifted sat of decomposed data samples $\{c^{M-n}_{2i+1,2j-1}\}$. This spatial shift module is configured and produces this set of date samples in the same way as does the corresponding spatial shift module 174 of the decomposition filter 134-M-n of FIG. 8b.

The horizontal dimension add/bit shifter (A/BS) 216 of the horizontal dimension filter stage 204 processes the sets of decomposed data samples $\{c^{M-n-1}_{2i+1,2j}\}$, $\{c^{M-n-1}_{2i-1,2j+1}\}$, and $\{c^{M-n-1}_{2i-1,2j-1}\}$ of the HL and HH component data $e^{M-n-1}$ and $f^{M-n-1}$ of the decomposed data $y^{M-n-1}$. In response, it produces the subset of intermediate reconstructed data samples $\{x^{M-n-1}_{2i+1,2j}\}$ of the intermediate reconstructed data $x^{M-n-1}$. This is done in accordance with Equation 9 (when it is rearranged to solve for the data sample $x^{M-n-1}_{2i+1,2j}$) and is the reverse operation to that performed by the corresponding horizontal dimension add/bill shifter (A/BS) 176 of the decomposition filter 134-M-n of Figure 8b. Thus, each intermediate reconstructed data sample $c^{M-n-1}_{2i+1,2j}$ is the weighted sum of the corresponding decomposed data sample $c^{M-n-1}_{2i+1,2j}$ in the decomposed data and the decomposed input data samples $c^{M-n-1}_{2i+1,2j-1}$ and $c^{M-n-1}_{2i+1,2j+1}$ that correspond to the intermediate reconstructed data samples $x^{M-n-1}_{2i+1,2j-1}$, and $x^{M-n-1}_{2i+1,2j+1}$ that are horizontally adjacent to the intermediate reconstructed data sample in the intermediate reconstructed data. The add/bit shifter includes adders ($\Sigma$) and bit shifters ($S^{-3}$ and $S^{-1}$) that together compute this weighted sum by using only add (including) and bit shift arithmetic operations.

The horizontal dimension filter stage 204 includes another horizontal dimension spatial shift module (H-D SS) 218. The spatial shift module spatially shifts the subset of reconstructed intermediate data samples $\{x^{M-n-1}_{2i+1,2j}\}$ of the reconstructed intermediate input data $x^{-n-1}$ down by one data sample in the horizontal dimension to produce the spatially shifted subset of intermediate reconstructed data samples $\{x^{M-n-1}_{2i+1,2j+2}\}$. This spatial shift module is configured and produces this set of data samples in the same way as does the corresponding spatial shift module 171 of the decomposition filter 134-M-n of FIG. 8b.

The horizontal dimension add/bit shifter (A/BS) 220 of the horizontal dimension filter stage 204 processes the subsets of intermediate reconstructed date samples $\{x^{M-n-1}_{2i+1,2j}\}$ and $\{x^{M-n-1}_{2i+1,2j+2}\}$ of the intermediate reconstructed data $x^{M-n-1}$ and the set of decomposed data samples $\{c^{M-n-1}_{2i+1,2j+1}\}$ of the LL component data $c^{M-n-1}$ of the decomposed data $y^{M-n-1}$. In response, it produces the subset of intermediate reconstructed data samples $\{x^{M-n-1}_{2i+1,2j+1}\}$ of the intermediate reconstructed data $x^{M-n-1}$. This is done in accordance with Equation 9 (when it is rearranged to solve for the data sample $x^{M-n-1}_{2i+1,2j+1}$) and is the reverse operation to that performed by the corresponding horizontal dimension add/bit shifter (A/BS) 172 of the decomposition filter 134-M-n of FIG. 8b. As a result, each intermediate reconstructed data sample $x^{M-n-1}_{2i+1,2j+1}$ is the weighted sum of the corresponding decomposed data sample $c^{M-n-1}_{2i+1,2j+1}$ in the decomposed data and the intermediate reconstructed data samples $x^{M-n-1}_{2i+1,2j+2}$ and $x^{M-n-1}_{2i+1,2j}$ that are horizontally adjacent to the intermediate reconstructed data sample in the intermediate reconstructed data. The add/bit shifter includes adders ($\Sigma$) and a bit shifter ($S^{-1}$) that together compute this weighted sum by using only add (including) and bit shift arithmetic operations.

The horizontal dimension filter staged 204 further includes horizontal dimension interleaving modules (H-D Int) 222 and 224. The interleaving module 222 interleaves the subsets of intermediate reconstructed data samples $\{x^{M-n-1}_{2i,2j}\}$ and $\{x^{M-n-1}_{2i,2j+1}\}$ in the horizontal dimension to produce the set of intermediate reconstructed data samples $\{x^{M-n-1}_{2i,l}\}$ of the intermediate reconstructed data $x^{M-n-1}$. Similarly, the interleaving module 224 interleaves the subsets of intermediate reconstructed data samples $\{x^{M-n-1}_{2i+1,2j}\}$ and $\{x^{M-n-1}_{2i+1,2j+1}\}$ in the horizontal dimension to produce the set of intermediate reconstructed date samples $\{x^{M-n-1}_{2i+1,l}\}$ of the intermediate reconstructed data $x^{M-n-1}$. These are the reverse operations of those performed by the corresponding horizontal dimension deinterleaving modules 162 and 170 of the decomposition filter 134-M-n of FIG. 5.

In order to do so, the horizontal dimension interleaving module 222 includes horizontal dimension interleavers (H-D Int) that respectively interleave the subsets of intermediate reconstructed data samples $\{x^{M-n-1}_{2i,2j}\}$ and $\{x^{M-n-1}_{2i,2j+1}\}$ in the horizontal dimension with zero valued data samples. This produces the subsets of intermediate reconstructed data samples $\{x^{M-n-1}_{2i,l}\}_1$ and $\{x^{M-n-1}_{2i,l+1}\}$. The interleaving module further includes a horizontal dimension spatial shifter ($z^1_j$) that spatially shifts the subset of intermediate reconstructed data samples $\{x^{M-n-1}_{2i,l+1}\}$ up by one data sample in the horizontal dimension. This produces the spatially shifted subset of intermediate reconstructed data samples $\{x^{M-n-1}_{2i,l}\}_2$.

As a result, in the first subset of intermediate reconstructed data samples $\{c^{M-n-1}_{2i,l}\}_1$, the data samples that have even vertical and horizontal indexes $k=2i$ and $l=2j$ comprise the intermediate reconstructed data samples $\{^{M-n-1}_{2i,2j}\}$ while all the other data samples have zero values. Similarly, in the second subset of intermediate reconstructed data samples $\{x^{M-n-1}_{2i,l}\}_2$, the data samples that have even vertical indexes $k=2i$ and odd horizontal indexes $l=2j+1$ comprise the intermediate reconstructed data samples $\{x^{M-n}_{2i,2j+1}\}$ while all the other data samples have zero values.

The horizontal dimension interleaving module 222 includes an adder ($\Sigma$) that adds the subsets of intermediate reconstructed input e data samples $\{x^{M-n-1}_{2i,l}\}_1$ and $\{x^{M-n-1}_{2i,l}\}_2$ together. This produces the set of intermediate reconstructed data samples $\{x^{M-n-1}_{2i,l}\}$ of the reconstructed intermediate data $x^{M-n-1}$.

Likewise, the horizontal dimension interleaving module 224 includes horizontal dimension interleavers (H-D Int) that respectively interleave the subsets of intermediate reconstructed data samples $\{x^{M-n-1}_{2i+1,2j}\}$ and $\{x^{M-n-1}_{2i+1,2j+1}\}$ in the horizontal dimension with zero valued date samples. This produces the subsets of intermediate reconstructed data samples $\{x^{M-n-1}_{2i+1,l}\}_1$ and $\{x^{M-n-1}_{2i+1,i+1}\}$. The interleaving module further includes a horizontal dimension spatial shifter ($z^1_j$) that spatially shifts the set of intermediate reconstructed data samples $\{x^{M-n-1}_{2i+1,l+1}\}$ up by one data sample in the horizontal dimension. This produces the spatially shifted subset of intermediate reconstructed data samples $\{x^{M-n-1}_{2i+1,l}\}_2$.

As a result, in the first subset of intermediate reconstructed data samples $\{x^{M-n-1}_{2i+1,l}\}_1$, the data samples that have odd vertical indexes $k=2i+1$ and even horizontal indexes $l=2j$ comprise the intermediate reconstructed data samples $\{x^{M-n-1}_{2i+1,2j}\}$ while all the other data samples have zero values. Similarly, in the second subset of intermediate reconstructed data samples $\{c^{M-n-1}_{2i+1,l}\}_2$, the data samples that have odd vertical and horizontal indexes $k=2i+1$ and $l=2j+1$ comprise the intermediate reconstructed data samplers $\{x^{M-n}_{2i+1,2j+1}\}$ while all the other data samples have zero values.

The horizontal dimension interleaving module 224 includes an adder ($\Sigma$) that adds the subsets of intermediate reconstructed data samples $\{x^{M-n-1}_{2i+1,l}\}_1$ and $\{x^{M-n-1}_{2i+1,l}\}_2$ together. This produces the set of intermediate reconstructed input data samples $\{x^{M-n-1}_{2i+1,l}\}$ of the reconstructed intermediate data $x^{M-n-1}$.

Referring to FIGS. 13a, 7, 9, and 10, the vertical dimension filter stage 202 includes a horizontal dimension spatial shift module (V-D SS) 226. The spatial shift module spatially shifts the set of intermediate reconstructed data samples $\{x^{M-n-1}_{2i+1,l}\}$ of the intermediate reconstructed data $x^{M-n-1}$ up by one data sample in the vertical dimension to produce the spatially shifted set of intermediate reconstructed data samples $\{x^{M-n-1}_{2i-1,l}\}$. This spatial shift module is configured and produces this set of data samples in the same way as does the corresponding spatial shift module 158 of the decomposition filter 134-M-n of FIG. 8a.

The vertical dimension add/bit shifter (A/BS) 228 of the vertical dimension filter stage 204 processes the sets of intermediate reconstructed data samples $\{x^{M-n-1}_{2i,l}\}$, $\{x^{M-n-1}_{2i+1,l}\}$, and $\{x^{M-n-1}_{2i-1,l}\}$ of the intermediate reconstructed input data $x^{M-n-1}$ in the vertical dimension. On response, it produces the subset of reconstructed data samples $\{c^{M-n}_{2i,l}\}$ of the reconstructed data $c^{M-n}$. This is done in accordance with Equation 6 (when it is rearranged to solve for the data sample $c^{M-n}_{2i,l}$) and is the reverse operation to that performed by the corresponding vertical dimension add/bit shifter (A/BS) 160 of the decomposition filter 134-M-n of FIG. 8a. Thus, each reconstructed data sample $C^{M-n}_{2i,l}$ is the weighted sum of the corresponding intermediate reconstructed data sample $x^{M-n-1}_{2i,2j}$ in the intermediate reconstructed data and the intermediate reconstructed data samples $x^{M-n-1}_{2i+1,l}$ and $x^{M-n-1}_{2i-1,l}$ that correspond to the reconstructed data samples $c^{M-n}_{2i+1,l}$ and $c^{M-n}_{2i-1,l}$ that are vertically adjacent to the reconstructed data sample in the reconstructed data. The add/bit shifter includes adders ($\Sigma$) and a bit shifter ($S^{-2}$) that together compute this weighted sum by using only add (including) and bit shift arithmetic operations.

The vertical dimension filter stage 202 includes a vertical dimension spatial shift module (V-D SS) 230. The spatial shift module spatially shifts the subset of reconstructed data samples $\{c^{M-n}_{2i,l}\}$ of the reconstructed data $c^{M-n}$ down by one data sample in the vertical dimension to produce the spatially shifted set of reconstructed data samples $\{c^{M-n}_{2i+1,l}\}$. This spatial shift module is configured and produces this set of data samples in the same way as does the corresponding spatial shift module 155 of the decomposition filter 134-M-n of FIG. 12.

The vertical dimension add/bit shifter (A/BS) 232 of the vertical dimension filter stage 202 processes the sets of reconstructed data samples $\{c^{M-n}_{2i,l}\}$ and $\{c^{M-n}_{2i+2,l}\}$ of the reconstructed data $c^{M-n}$ and the set of intermediate reconstructed data samples $\{x^{M-n-1}_{2i+1,l}\}$ of the intermediate reconstructed input data $x^{M-n-1}$. In response, it produces the subset of reconstructed data samples $\{c^{M-n}_{2i+1,l}\}$ of the reconstructed data. This is done in accordance with Equation 5 (when it is rearranged to solve for the data sample $c^{M-n}_{2i+1,l}$) and is the reverse operation to that performed by the corresponding horizontal dimension add/bit shifter (A/BS) 156 of the decomposition filter 134-M-n of Figure 8a. As a result, each reconstructed data sample $c^{M-n}_{2i+1,l}$ is the weighted sum of the corresponding intermediate reconstructed data sample $x^{M-n-1}_{2i+1,l}$ in the intermediate reconstructed data and the reconstructed data samples $c^{M-n}_{2i+2,l}$ and $c^{M-n}_{2i,l}$ that are vertically adjacent to the reconstructed date sample in the reconstructed data. The add/bit shifter includes adders ($\Sigma$) and bit shifters ($S^{-1}$) that together compute this weighted sum by using only add (including) and bit shift arithmetic operations.

The vertical dimension filter stage 202 also includes a vertical dimension interleaving module (V-D Int) 234. The interleaving module interleaves the subsets of reconstructed data samples $\{c^{M-n}_{2i,l}\}$ and $\{c^{M-n}_{2i+1,l}\}$ in the vertical dimension to produce the single set of reconstructed data samples $\{c^{M-n}_{k,l}\}$ of the reconstructed data $c^{M-n}$. This is the reverse operation of that performed by the corresponding vertical dimension deinterleaving module 154 of the decomposition filter 134-M-n of FIG. 8a.

In order to do so, the vertical dimension interleaving module 234 includes vertical dimension interleavers (V-D Int) to respectively interleave the subsets of reconstructed date samples $\{c^{M-n}_{2i,l}\}$ and $\{c^{M-n}_{2i+1,l}\}$ in the vertical dimension with zero valued date samples. This produces the subsets of reconstructed data samples $\{c^{M-n}_{k,l}\}_1$ and $\{c^{M-n}_{k+1,l}\}$. The interleaving module further includes a vertical dimension spatial shifter ($z^1_i$) that spatially shifts the subset of reconstructed data samples $\{c^{M-n}_{k+1,l}\}$ up by one in the vertical dimension. This produces the spatially shifted subset of reconstructed data samples $\{c^{M-n}_{k,l}\}_2$.

Thus, in the first subset of reconstructed data samples $\{c^{M-n}_{k,l}\}_1$, the data samples that have even vertical and horizontal indexes k=2i comprise the reconstructed data samples $\{c^{M-n}_{2i,l}\}$ while all the other data samples have zero values. Similarly, in the second subset of reconstructed data samples $\{c^{M-n}_{k,l}\}_2$, the data samples that have odd vertical indexes k=2i+1 comprise the reconstructed data samples $\{c^{M-n}_{2i+1,l}\}$ while all the other data samples have zero values.

The vertical dimension interleaving module 234 includes an adder ($\Sigma$) that adds the subsets of reconstructed data samples $\{c^{M-n}_{k,l}\}_1$ and $\{c^{M-n}_{k,l}\}_2$ together. This produces the complete set of reconstructed data samples $\{c^{M-n}_{k,l}\}$ of the reconstructed data $c^{M-n}$.

Therefore, referring back to FIGS. 3 and 11, the inverse wavelet-like transform generator 132 uses N reconstruction filters 180-M-N+1 to 180-M of the type just described to reconstruct complete decomposed 2-D data $z^{M-N}$ into complete reconstructed 2-D data $c^M$. This is done with N reconstructions over N resolution levels using the HH, HL, and LH component 2-D data $\{f^{M-1}, e^{M-1}, d^{M-1}, \ldots, f^{M-n}, e^{M-n}, d^{M-n}, f^{M-n-1}, e^{M-n-1}, d^{M-n-1}\}$ produced by the reconstruction filters and the HH, HL, LH, and LL component 2-D data $f^{M-N}, e^{M-N}, d^{M-N}$, and $c^{M-N}$ of the complete decomposed 2-D data $z^{M-N}$.

1-D Wavelet-Like Transformation

Referring back to FIGS. 1 and 2, as discussed earlier, the original data selected to be compressed may be 1-D data that comprises a set of data samples in one predefined spatial dimension. However, like the data samples of data, each data sample has a value representing a physical property. For example, the 1-D data may be audio data with a set of data samples representing sound. In this case, the value of each data sample represents the intensity of the sound at the time of the data sample.

The wavelet-like transform generator 122 for such an embodiment is similar to that shown in FIG. 4. In this case, it decomposes original 1-D data $c^M$ in a MRA 1-D space using an MRA 1-D wavelet-like transform. Thus, at each resolution level M-n, input 1-D data $c^{M-n}$ provided to the corresponding level M-n 1-D decomposition filter is decomposed using the wavelet-like transform into L (low frequency sub-band) and H (high frequency sub-band) component 1-D data $c^{M-n-1}$ and $d^{M-n-1}$ that form the decomposed 1-D data $y^{M-n-1}$. The data samples of the L and H component data respectively represent the data samples of the input data in a low frequency sub-band (i.e., having data sample values with low frequency in the predefined spatial dimension) and high frequency sub-band (i.e., having data sample values with high frequency in the predefined spatial dimension).

Thus, at the first resolution level M at which this is done, the original 1D data is the input 1-D data $c^M$ to the level M decomposition filter. And, at each subsequent resolution level M−n, the L component 1-D data $c^{M-n}$ from the previous resolution level M−n+1 is the input data to the corresponding level M−n decomposition filter. As a result, the complete decomposed 1-D data $z^{M-N}$ comprises the H component 1-D data $\{d^{M-1}, \ldots, d^{M-n}, d^{M-n-1}, \ldots, d^{M-N}\}$ from each of the decomposition levels and the L component 1-D data $c^{M-N}$ produced by the level M−N+1 decomposition filter at the last resolution level M−N+1 at which a decomposition is made.

Moreover, in this embodiment, the level M−n decomposition filter for each resolution level M−n is configured and operates in the same way as the vertical dimension filter stage 152 or the composition filter 134-M−n of FIG. 8a. Specifically, the decomposition filter decomposed the set of input data samples $c_{M-nK}$ of the input 1-D data $c^{M-n}$ into the sets of decomposed data samples $\{c^{M-n-1}_{2i}\}$ and $\{c^{M-n-1}_{2i+1}\}$ of the L and H component 1-D data $c^{M-n-1}$ and $d^{M-n-1}$ respectively, of the decomposed 1-D data $y^{M-n-1}$. This is done in the manner described earlier for the vertical filter stage and in accordance with Equations 5 and 6, but where the subscript l is dropped to indicate 1-D operation, the decomposed data $y^{M-n-1}$ comprises the data $x^{M-n-1}$, and the sets of decomposed data samples $\{c^{M-n-1}_{2i}\}$ and $\{c^{M-n-1}_{2i+1}\}$ comprises the sets of data samples $\{x^{M-n-1}_{2i,l}\}$ and $\{x^{M-n-1}_{2i+1,l}\}$.

Additionally, the level M−n decomposition filter in this embodiment may include respective bit shifters to fine tune the energy of the L and H component data $c^{M-n-1}$ and $d^{M-n-1}$ for quantization purposes. In doing so, the bit shifters would shift the bits of the respective sets of decomposed data samples $\{c^{M-n-1}_{2i}\}$ and $\{c^{M-n-1}_{2i+1}\}$ of the L and H component data by respective predefined amounts.

Thus, similar to that described earlier for original 2-D data, the wavelet-like transform generator 122 uses N decomposition filters of the type just described to decompose the original 1-D data $c_M$ over N corresponding resolution levels. The resulting H component 1-D data $\{d^{M-1}, \ldots, d_{M-n}, d^{M-n-1}, \ldots, d^{M-N}\}$ and the L component 1-D data $c^{M-N}$ comprise the complete decomposed 1-D data $z^{M-N}$.

1-D Inverse Wavelet-like Transformation

Referring again to FIG. 1 and 2, the inverse wavelet transform generator 132 may be used to reconstruct complete decomposed 1-D data $z^{M-N}$ of the type just described. In doing so, the inverse wavelet transform generator uses a MRA 1-D inverse wavelet-like transform corresponding to the 1-D wavelet-like transform just described to reconstruct the complete decomposed data into complete reconstructed 1-D data $c^M$.

In these embodiments, the level M−n reconstruction filter for each resolution level M−n is conceptually configured and effectively operates in the same way as the vertical dimension filter stage 202 of the reconstruction filter 180-M−n of FIG. 13a. Specifically, the reconstruction filter reconstructs the sets of decomposed data samples $\{c^{M-n-1}_{2i}\}$ and $\{c^{M-n-1}_{2i+1}\}$ of the L and H component 1-D data $c^{M-n-1}$ and $d^{M-n-1}$, respectively, of the decomposed 1-D data $y^{M-n-1}$ into the set of reconstructed data samples $\{c^{M-n}_{2i}\}$ of the reconstructed 1-D data $c^{M-n}$. Similar to the corresponding wavelet-like transform, this is done in the manner described earlier for the vertical filter stage and in accordance with Equations 5 and 6, but where the subscript l is dropped to indicate 1-D operation, the decomposed data $y^{M-n-1}$ comprises the data $x^{M-n-1}$, and the sets of decomposed data sample $\{c^{M-n-1}_{2i}\}$ and $\{c^{M-n-1}_{2i+1}\}$ comprise the sets of date Samples $\{x^{M-n-1}_{2i,l}\}$ and $\{x^{M-n-1}_{2i+1,l}\}$.

As with the level M−n 1-D decomposition filter just described, this embodiment of the reconstruction filter may include respective bit shifters to re-tune the energy of the L and H component data $c^{M-n-1}$ and $d^{M-n-1}$ after dequantization. In doing so, the bit shifters would shift the bits of the respective sets of decomposed data samples $\{c^{M-n-1}_{2i}\}$ and $\{c^{M-n-1}_{2i+1}\}$ of the L and H component data by respective predefined amounts opposite to the amounts spatially shifted in decomposition.

Conclusion

In the foregoing described embodiments of the decomposition filter 134-M−n, the wavelet-like transformation just described is performed on input data by first deinterleaving the set of data samples of the input data into subsets. Then, each subset of the input data samples is processed with a corresponding processing operation using only bit shifting, adding, and subtracting operations to produce a corresponding set of decomposed data samples. Thus, time is not wasted in performing the corresponding processing operation for each subset on the input data samples of the other subsets.

Similarly, in the foregoing described embodiments of the reconstruction filter 180-M−−n, the inverse wavelet-like transformation just described is performed on decomposed data by first processing each set of decomposed data samples of the decomposed data with a corresponding processing operation using only bit shifting, adding, and subtracting operations to produce a corresponding subset of reconstructed data samples. Then, the subsets of reconstructed data samples are interleaved to produce a set of reconstructed data samples. Thus, time is not wasted in performing the corresponding processing operation for each set of decomposed data samples on the data samples of the other sets.

Also, since only bit shifting, adding, and subtracting operations are used, only simple faxed point computations re made in performing these wavelet-like and inverse wavelet-like transformations. Furthermore, other combinations of bit shifting, adding, and subtracting operations than those described earlier in accordance with Equations 1–10 could be used to implement the wavelet-like and inverse wavelet-like transformations.

For example, rather than using Equation 2, each decomposed data sample $c^{M-n-1}_{2i+1,2j}$ of the HL component 2-D data $e^{M-n-1}$ could be produced in the 2-D wavelet-like transformation according to:

$$c^{M-n-1}_{2i+1,2j} = \qquad \text{Equation 11}$$
$$S^1[c^{M-n}_{2i+1,2j} - S^{-4}(c^{M-n}_{2i,2j} + c^{M-n}_{2i+2,2j}) - S^{-1}(c^{M-n}_{2i,2j} + c^{M-n}_{2i+2,2j}) + $$
$$S^{-4}(c^{M-n}_{2i-2,2j} + c^{M-n}_{2i+4,2j}) + S^{-2}(c^{M-n-1}_{2i+1,2j-1} + c^{M-n-1}_{2i+1,2j+1})]$$

And, each corresponding reconstructed data sample $c^{M-n}_{2i+1,2j}$ of the reconstructed data $c^{M-n}$ could also be produced in the inverse wavelet-like transformation according to Equation 11 (when it is rearranged to solve for the data sample $c^{M-n}_{2i+1,2j}$)

Similarly, instead of using Equation 3, each decomposed data sample $c^{M-n-1}_{2i,2j+1}$ of the LH component 2-D data $d^{M-n-1}$ could be produced in the wavelet-like transformation according to:

$$c_{2i,2j+1}^{M-n+1} = \text{Equation 12}$$
$$S^1[c_{2i,2j+1}^{M-n} - S^{-1}(c_{2i,2j}^{M-n} + c_{2i,2j+2}^{M-n}) - S^{-4}(c_{2i,2j}^{M-n} + c_{2i,2j+2}^{M-n}) +$$
$$S^{-4}(c_{2i,2j-2}^{M-n} + c_{2i,2j+4}^{M-n}) + S^{-2}(c_{2i+1,2j+1}^{M-n-1} + c_{2i-1,2j+1}^{M-n-1})]$$

And, each corresponding reconstructed data sample $c^{M-n}_{2i,2j+1}$ of the reconstructed data $c^{M-n}$ could also be produced in the inverse wavelet-like transformation according to Equation 12 (when it is rearranged to solve for the data sample $c^{M-n}_{2i,2j+1}$).

Thus, the deinterleaving, interleaving, bit shifting, adding, and subtracting operations just described provide fast and efficient wavelet-like and inverse wavelet-like transformations for decomposing input data and reconstructing decomposed data. As described earlier, this is applicable to 2-D and 1-D data. However, as those skilled in the art will recognize, it may also be applicable to data with more than one or two dimensions.

The wavelet-like transform generator 122 has been described for use with an encoder 126 and quantizer 130 for compression of original data. Similarly, the wavelet-like inverse transform generator 132 has been described for use with a decoder 128 and dequantizer 130 for decompression of encoded data. But, those skilled in the art will recognize that the wavelet-like and inverse wavelet-like transformations described herein and performed by the wavelet-like and inverse wavelet-like transform generators may be used for other purposes. In such a case, a digital signal processor (DSP) could be used to post-process and/or pre-process the wavelet-like and inverse-wavelet-like transformations.

Figure 14:
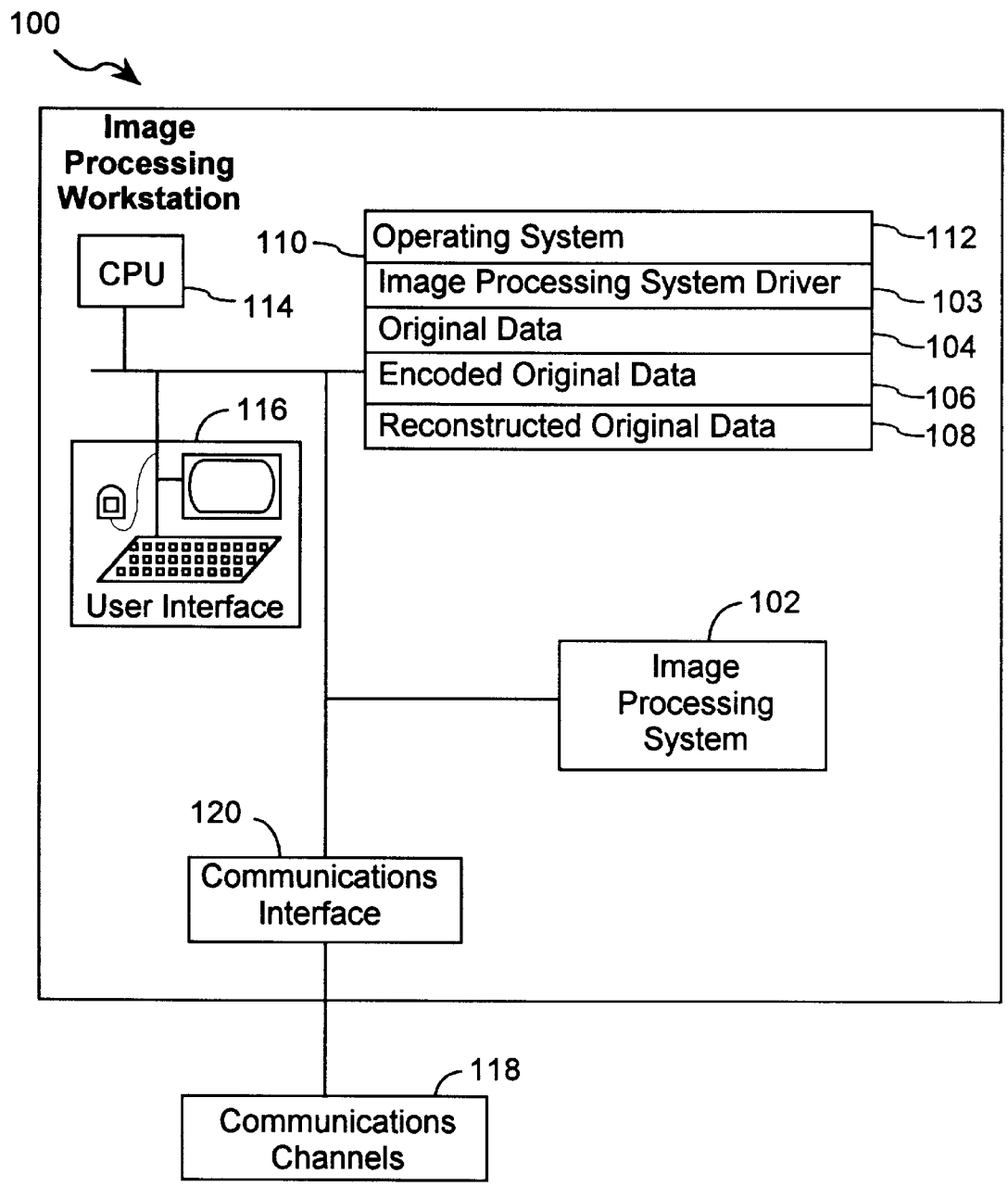
FIG. 14 is a block diagram of a data processing workstation with a hardware implemented date processing system in accordance with the present invention.

Moreover, in FIG. 1, the data processing system 102 that employs the wavelet-like transform generator 122 and the inverse wavelet-like transform generator 132 was shown in a software implementation. However, a hardware implementation of the data processing system would also take advantage of the benefits of the 1-D and 2-D wavelet-like and inverse wavelet-like transformations just described. FIG. 14 shows such an embodiment. Here, the image processing system is a hardware device and is driven by the data processing system driver 103 which is stored in the memory 110 and run on the CPU 114. This is done under the control of the operating system 112 and in response to commands issued by the user with the user interface 116.

Finally, when the present invention has been described with reference to a few specific embodiments, the description is illustrative of the invention and is not to be construed as limiting the invention. Various modifications many occur to those skilled in the art without departing from the true spirit and scope of the invention as defined by the appended claims.

What is claimed is:

1. A wavelet-like transform generator for performing a wavelet-like transformation of input data into decomposed data, the input data comprising a set of input data samples and the decomposed data comprising LL, LH, HL and HH sets of decomposed data samples, the wavelet-like transform generator comprising:
   a deinterleaving module that deinterleaves the set of input data samples to produce subsets of the set of input data samples; and
   a decomposed data sample computation module that generates the LL, LH, HL and HH set of decomposed data samples from the subsets of input data samples in accordance with predefined high spatial frequency and low spatial frequency decomposition filter functions, the computation module using only add and bit shift operations to generate each decomposed data sample, the shift operations for dividing and multiplying values by factors equal to integer powers of 2, such that each decomposed data sample is generated as a weighted sum of values in accordance with a respective one of the predefined high high spatial frequency and low spatial frequency decomposition filter functions,
   wherein
   each of the filter functions has an associated set of coefficients that are each equal to an integer or an integer divided by an integer power of two; and
   the decomposition filter functions have corresponding inverse filter functions that, when applied to the decomposed data samples, reconstruct the set of input data samples.

2. A wavelet-like transform generator for performing a wavelet-like transformation of input data into decomposed data, the input data comprising a set of input data samples and the decomposed data comprising LL, LH, HL and HH sets of decomposed data samples, the wavelet-like transform generator comprising:
   a deinterleaving module that deinterleaves the set of input data samples to produce deinterleaved sets of input data samples;
   HH decomposed data sample generation circuitry that generates each HH decomposed data sample as a weighted sum of a predefined set of data samples from the deinterleaved sets of input data samples;
   HL decomposed data sample generation circuitry that generates each HL decomposed data sample as a weighted sum of a predefined set of (A) data samples from the deinterleaved sets of input data samples, and (B) the HH decomposed data samples;
   LH decomposed data sample generation circuitry that generates each LH decomposed data sample as a weighted sum of a predefined set of (A) data samples from the deinterleaved sets of input data samples, and (B) the HH decomposed data samples; and
   LL decomposed data sample generation circuitry that generates each LH decomposed data sample as a weighted sum of a predefined set of (A) data samples from the deinterleaved sets of input data samples, and (B) the HH, HL and LH decomposed data samples.

3. The wavelet-like transform generator of claim 2, wherein
   the HH, HL, LH and LL decomposed sets of data samples are generated in accordance with first, second, third and fourth filter functions having associated coefficients, and all the coefficients of the first, second, third and fourth filter functions are rational numbers that are each equal to a respective integer or a respective integer divided by an integer power of two; and
   the first, second, third and fourth filter functions have corresponding inverse filter functions that, when applied to the decomposed data samples, reconstruct the set of input data samples.

4. A wavelet-like transform generator for performing a wavelet-like transformation of input data into decomposed data, the input data comprising a set of input data samples and the decomposed data comprising a plurality of sets of decomposed data samples including at least first and second sets of decomposed data samples wherein the first decomposed data set contains high spatial frequency information and the second decomposed data set contains low spatial frequency information, the wavelet-like transform generator comprising:

a deinterleaving module that deinterleaves the set of input data samples to produce deinterleaved sets of input data samples;

first decomposed data sample generation circuitry that generates each data sample of the first set of decomposed data samples as a first predefined weighted sum of a predefined set of data samples from the deinterleaved sets of input data samples; and second decomposed data sample generation circuitry that generates each data sample of the second set of decomposed data samples as a second predefined weighted sum of a predefined set of (A) data samples from the deinterleaved sets of input data samples, and (B) the first set of decomposed data samples.

5. The wavelet-like transform generator of claim 4, wherein the first and second decomposed sets of data samples are generated in accordance with first and second wavelet-like decomposition filter functions having associated coefficients, and all the coefficients of the first and second filter functions are rational numbers that are each equal to a respective integer or a respective integer divided by an integer power of two; and the first and second filter functions have corresponding inverse filter functions that, when applied to the decomposed data samples, reconstruct the set of input data samples.

6. A method of transforming input data into decomposed data, the input data comprising a set of input data samples and the decomposed data comprising LL, LH, HL and HH sets of decomposed data samples, the method comprising steps of:

deinterleaving the set of input data samples to produce subsets of the set of input data samples; and generating the LL, LH, HL and HH set of decomposed data samples from the subsets of input data samples in accordance with predefined high spatial frequency and low spatial frequency wavelet-like decomposition filter functions, using only add and bit shift operations to generate each decomposed data sample, the shift operations for dividing and multiplying values by factors equal to integer powers of 2, such that each decomposed data sample is generated as a weighted sum of values in accordance with a respective one of the predefined high high spatial frequency and low spatial frequency wavelet-like decomposition filter functions, wherein each of the filter functions has an associated set of coefficients that are each equal to an integer or an integer divided by an integer power of two; and the decomposition filter functions have corresponding inverse filter functions that, when applied to the decomposed data samples, reconstruct the set of input data samples.

7. A method of performing a wavelet-like transformation of input data into decomposed data, the input data comprising a set of input data samples and the decomposed data comprising LL, LH, HL and HH sets of decomposed data samples, the method comprising steps of:

deinterleaving the set of input data samples to produce deinterleaved sets of input data samples;

generating each HH decomposed data sample as a weighted sum of a predefined set of data samples from the deinterleaved sets of input data samples;

generating each HL decomposed data sample as a weighted sum of a predefined set of (A) data samples from the deinterleaved sets of input data samples, and (B) the HH decomposed data samples;

generating each LH decomposed data sample as a weighted sum of a predefined set of (A) data samples from the deinterleaved sets of input data samples, and (B) the HH decomposed data samples; and generating each LH decomposed data sample as a weighted sum of a predefined set of (A) data samples from the deinterleaved sets of input data samples, and (B) the HH, HL and LH decomposed data samples.

8. The method of claim 7, wherein the HH, HL, LH and LL decomposed sets of data samples are generated in accordance with first, second, third and fourth filter functions having associated coefficients, and all the coefficients of the first, second, third and fourth filter functions are rational numbers that are each equal to a respective integer or a respective integer divided by an integer power of two; and the first, second, third and fourth filter functions have corresponding inverse filter functions that, when applied to the decomposed data samples, reconstruct the set of input data samples.

9. A method of performing a wavelet-like transformation of input data into decomposed data, the input data comprising a set of input data samples and the decomposed data comprising a plurality of sets of decomposed data samples including at least first and second sets of decomposed data samples wherein the first decomposed data set contains high spatial frequency information and the second decomposed data set contains low spatial frequency information, the wavelet-like transform generator comprising:

deinterleaving the set of input data samples to produce deinterleaved sets of input data samples;

generating each data sample of the first set of decomposed data samples as a first predefined weighted sum of a predefined set of data samples from the deinterleaved sets of input data samples; and generating each data sample of the second set of decomposed data samples as a second predefined weighted sum of a predefined set of (A) data samples from the deinterleaved sets of input data samples, and (B) the first set of decomposed data samples.

10. The method of claim 9, wherein the first and second decomposed sets of data samples are generated in accordance with first and second wavelet-like decomposition filter functions having associated coefficients, and all the coefficients of the first and second wavelet-like decomposition filter functions are rational numbers that are each equal to a respective integer or a respective integer divided by an integer power of two.

11. A wavelet-like transform generator for performing an inverse wavelet-like transformation of decomposed data into reconstructed data, the decomposed data comprising LL, LH, HL and HH sets of decomposed data samples and the reconstructed data comprising an array of reconstructed data samples, the inverse wavelet-like transform generator comprising:

a reconstructed data sample computation module that generates first, second, third and fourth sets of reconstructed data samples from the LL, LH, HL and HH sets of decomposed data samples in accordance with predefined first, second, third and fourth reconstruction filter functions, the computation module using only add and bit shift operations to generate each reconstructed data sample, the shift operations for dividing and multiplying values by factors equal to integer powers of 2, such that each reconstructed data sample is generated as a weighted sum of values in accordance with a respective one of the predefined first, second, third and fourth reconstruction filter functions, wherein each of the reconstruction filter functions has an associated set of coefficients that are each equal to an integer or an integer divided by an integer power of two; and interleaving circuitry for interleaving the first, second, third and fourth sets of reconstructed data samples so as to generate the array of reconstructed data samples;

wherein the first, second, third and fourth filter functions have corresponding decomposition filter functions that, when applied to the reconstructed data samples, would regenerate the set of decomposed data samples.

12. A wavelet-like transform generator for performing an inverse wavelet-like transformation of decomposed data into reconstructed data, the decomposed data comprising LL, LH, HL and HH sets of decomposed data samples and the reconstructed data comprising an array of reconstructed data samples, the inverse wavelet-like transform generator comprising:

LL reconstruction circuitry that generates a first set of reconstructed data samples, each reconstructed data sample in the first set being generated as a weighted sum of a predefined set of decomposed data samples from the LL, LH, HL and HH sets;

LH reconstruction circuitry that generates a second set of reconstructed data samples, each reconstructed data sample in the second set being generated as a weighted sum of a predefined set of decomposed data samples from the LH and HH sets and a predefined set of reconstructed data samples from the first set;

HL reconstruction circuitry that generates a third set of reconstructed data samples, each reconstructed data sample in the third set being generated as a weighted sum of a predefined set of decomposed data samples from the HL and HH sets and a predefined set of reconstructed data samples from the first set;

HH reconstruction circuitry that generates a fourth set of reconstructed data samples, each reconstructed data sample in the fourth set being generated as a weighted sum of a predefined set of decomposed data samples from the HH set and a predefined set of reconstructed data samples from the first, second and third sets; and interleaving circuitry for interleaving the first, second, third and fourth sets of reconstructed data samples so as to generate the array of reconstructed data samples.

13. The wavelet-like transform generator of claim 12, wherein the first, second, third and fourth sets of reconstructed data samples are generated in accordance with first, second, third and fourth filter functions having associated coefficients, and all the coefficients of the first, second, third and fourth filter functions are rational numbers that are each equal to a respective integer or a respective integer divided by an integer power of two; and the first, second, third arid fourth filter functions have corresponding decomposition filter functions that, when applied to the reconstructed data samples, would regenerate the set of decomposed data samples.

14. A wavelet-like transform generator for performing an inverse wavelet-like transformation of decomposed data into reconstructed data, the decomposed data comprising a plurality of distinct sets of decomposed data samples and the reconstructed data comprising an array of reconstructed data samples, the inverse wavelet-like transform generator comprising:

a first reconstruction data sample generation circuit that generates a first set of reconstructed data samples, each reconstructed data sample in the first set being generated as a weighted sum of a predefined set of the decomposed data samples from the plurality of distinct sets;

at least one additional reconstruction data sample generation circuit for generating at least one additional set of reconstructed data samples, each respective additional circuit generating a respective additional set of reconstructed data samples, each reconstructed data sample in each respective additional set being generated as a weighted sum of (A) a predefined set of the decomposed data samples from a respective subset of the plurality of distinct sets and (B) a predefined set of reconstructed data samples from a respective subset of the first set and the at least one other additional set;

interleaving circuitry for interleaving the first set and the at least one additional set of reconstructed data samples so as to generate the array of reconstructed data samples.

15. The wavelet-like transform generator of claim 14, wherein the first set and the at least one additional set of reconstructed data samples are generated in accordance with first and at least one additional filter functions having associated coefficients, and all, the coefficients of the first and at least one additional filter functions are rational numbers that are each equal to a respective integer or a respective integer divided by an integer power of two; and the first and at least one additional filter functions have corresponding decomposition filter functions that, when applied to the reconstructed data samples, would regenerate the set of decomposed data samples.

16. A method of performing an inverse wavelet-like transformation of decomposed data into reconstructed data, the decomposed data comprising LL, LH, HL and HH sets of decomposed data samples and the reconstructed data comprising an array of reconstructed data samples, the method comprising steps of:

generating first, second, third and fourth sets of reconstructed data samples from the LL, LH, HL and HH sets of decomposed data samples in accordance with predefined first, second, third and fourth reconstruction filter functions, the computation module using only add and bit shift operations to generate each reconstructed data sample, the shift operations for dividing and multiplying values by factors equal to integer powers of 2, such that each reconstructed data sample is generated as a weighted sum of values in accordance with a respective one of the first, second, third and fourth reconstruction filter functions, wherein each of the reconstruction filter functions has an associated set of coefficients that are each equal to an integer or an integer divided by an integer power of two; and interleaving circuitry for interleaving the first, second, third and fourth sets of reconstructed data samples so as to generate the array of reconstructed data samples;

wherein the first, second, third and fourth filter functions have corresponding decomposition filter functions that, when applied to the reconstructed data samples, would regenerate the set of decomposed data samples.

17. A method of performing an inverse wavelet-like transformation of decomposed data into reconstructed data, the decomposed data comprising LL, LH, HL and HH sets of decomposed data samples and the reconstructed data comprising an array of reconstructed data samples, the method comprising steps of:

generating a first set of reconstructed data samples, each reconstructed data sample in the first set being generated as a weighted sum of a predefined set of decomposed data samples from the LL, LH, HL and HH sets;

generating a second set of reconstructed data samples, each reconstructed data sample in the second set being generated as a weighted sum of a predefined set of decomposed data samples from the LH and HH sets and a predefined set of reconstructed data samples from the first set;

generating a third set of reconstructed data samples, each reconstructed data sample in the third set being generated as a weighted sum of a predefined set of decomposed data samples from the HL and HH sets and a predefined set of reconstructed data samples from the first set;

generating a fourth set of reconstructed data samples, each reconstructed data sample in the fourth set being generated as a weighted sum of a predefined set of decomposed data samples from the HH set and a predefined set of reconstructed data samples from the first, second and third sets; and interleaving circuitry for interleaving the first, second, third and fourth sets of reconstructed data samples so as to generate the array of reconstructed data samples.

18. The method of claim 17, wherein the first, second, third and fourth sets of reconstructed data samples are generated in accordance with first, second, third and fourth filter functions having associated coefficients, and all the coefficients of the first, second, third and fourth filter functions are rational numbers that are each equal to a respective integer or a respective integer divided by an integer power of two; and the first, second, third and fourth filter functions have corresponding decomposition filter functions that, when applied to the reconstructed data samples, would regenerate the set of decomposed data samples.

19. A method of performing an inverse wavelet-like transformation of decomposed data into reconstructed data, the decomposed data comprising a plurality of distinct sets of decomposed data samples and the reconstructed data comprising an array of reconstructed data samples, the method comprising steps of:

generating a first set of reconstructed data samples, each reconstructed data sample in the first set being generated as a weighted sum of a predefined set of the decomposed data samples from the plurality of distinct sets;

generating at least one additional set of reconstructed data samples, each reconstructed data sample in each respective additional set being generated as a weighted sum of (A) a predefined set of the decomposed data samples from a respective subset of the plurality of distinct sets and (B) a predefined set of reconstructed data samples from a respective subset of the first set and the at least one other additional set;

interleaving the first set and the at least one additional set of reconstructed data samples so as to generate the array of reconstructed data samples.

20. The method of claim 19, wherein the first set and the at least one additional set of reconstructed data samples are generated in accordance with first and at least one additional filter functions having associated coefficients, and all the coefficients of the first and at least one additional filter functions are rational numbers that are each equal to a respective integer or a respective integer divided by an integer power of two; and the first and at least one additional filter functions have corresponding decomposition filter functions that, when applied to the reconstructed data samples, would regenerate the set of decomposed data samples.

* * * * *

UNITED STATES PATENT AND TRADEMARK OFFICE
CERTIFICATE OF CORRECTION

PATENT NO. : 5,909,518
DATED : June 1, 1999
INVENTOR(S) : Charles K. Chui

It is certified that error appears in the above-identified patent and that said Letters Patent is hereby corrected as shown below:

On the title page, under item [56],

OTHER PUBLICATIONS, "Chui, Charles R." should read --Chui, Charles K.

Signed and Sealed this

Twenty-eighth Day of March, 2000

Attest:

Q. TODD DICKINSON

*Attesting Officer*     *Commissioner of Patents and Trademarks*